(12) United States Patent
Jung et al.

(10) Patent No.: US 9,578,317 B2
(45) Date of Patent: Feb. 21, 2017

(54) TWO-DIMENSIONAL/THREE-DIMENSIONAL SWITCHABLE DISPLAY APPARATUS

(71) Applicant: Samsung Display Co., Ltd., Yongin (KR)

(72) Inventors: Kyung-Ho Jung, Seongnam-si (KR); Ji-Woong Jeong, Yongin-si (KR); Hae-Young Yun, Suwon-si (KR); Seung-Jun Jeong, Hwaseong-si (KR); Joo-Young Kim, Suwon-si (KR); Cheol-Woo Park, Suwon-si (KR); Il-Yong Yoon, Seoul (KR); Seung-Hoon Lee, Hwaseong-si (KR); Jin-Hwan Kim, Suwon-si (KR); Il-Joo Kim, Hwaseong-si (KR); Jung-Hwan Yi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/717,712

(22) Filed: May 20, 2015

(65) Prior Publication Data

US 2015/0256821 A1 Sep. 10, 2015

Related U.S. Application Data

(62) Division of application No. 13/690,549, filed on Nov. 30, 2012, now Pat. No. 9,063,360.

(30) Foreign Application Priority Data

Nov. 30, 2011 (KR) ........................ 10-2011-0126799

(51) Int. Cl.
*H04N 13/04* (2006.01)
*G02F 1/133* (2006.01)
(Continued)

(52) U.S. Cl.
CPC .......... *H04N 13/0454* (2013.01); *G02B 27/22* (2013.01); *G02B 27/2214* (2013.01);
(Continued)

(58) Field of Classification Search
CPC ............ H04N 13/0404; H04N 13/0454; H04N 13/0452; H04N 13/0497; H04N 13/0289; H04N 13/0409; H04N 13/0415; H04N 13/045; H04N 13/0402; H04N 13/0413; H04N 13/0438; H04N 2213/001; G02B 27/2214; G02B 27/22; G02B 27/2264; G02F 1/1335; G02F 1/133526; G02F 1/13471; G02F 1/134309; G02F 1/13306; G02F 1/1343; G02F 1/134336; G02F 1/1323; G02F 1/141; G02F 1/133615; G02F 1/133602; G02F 1/13; G02F 1/133; G09G 3/003; G09G 3/3614; G09G 3/3406; G09G 3/36; G09G 3/3275; G09G 2300/0426; G09G 2310/0237; G09G 2310/06; G09G 5/14; G09G 5/18
(Continued)

(56) References Cited

U.S. PATENT DOCUMENTS 6,930,750 B2 8/2005 Miyachi et al.
7,058,252 B2 6/2006 Woodgate et al.
(Continued)

FOREIGN PATENT DOCUMENTS

KR  10-2009-0004006  1/2009
KR  10-2011-0104701  9/2011

OTHER PUBLICATIONS

Huang, Yi-Pai, et al., "25.1: High Resolution Autostereoscopic 3D Display with Scanning Multi-Electrode Driving Liquid Crystal (MeD-LC) Lens," SID 09 Digest, Taiwan.
(Continued)

*Primary Examiner* — Thoi Duong
(74) *Attorney, Agent, or Firm* — H.C. Park & Associates, PLC

(57) ABSTRACT

A two-dimensional/three-dimensional switchable display apparatus includes: a display panel; a first substrate disposed on the display panel; a first electrode layer disposed on the first substrate and including a plurality of first electrodes; a second substrate disposed on the first substrate; a second
(Continued)

electrode layer disposed on the second substrate and including a plurality of second electrodes; and a liquid crystal layer disposed between the first and second substrates. A plurality of lens units are formed in association with a first position of the liquid crystal layer when a lens forming voltage profile is applied to the first electrodes and a common voltage is applied to the second electrodes. When the common voltage is applied to the first electrodes and the lens forming voltage is applied to the second electrodes, the plurality of lens units are formed in association with a second position spaced apart from the first position.

10 Claims, 14 Drawing Sheets

(51) Int. Cl.
*G02F 1/1343* (2006.01)
*G02F 1/1335* (2006.01)
*G02F 1/1347* (2006.01)
*G02F 1/29* (2006.01)
*G02B 27/22* (2006.01)
*G09G 3/36* (2006.01)

(52) U.S. Cl.
CPC ........ *G02F 1/1343* (2013.01); *G02F 1/13306* (2013.01); *G02F 1/13471* (2013.01); *G02F 1/133526* (2013.01); *G02F 1/29* (2013.01); *G09G 3/3614* (2013.01); *G09G 3/3696* (2013.01); *H04N 13/0404* (2013.01); *H04N 13/0447* (2013.01); *H04N 13/0452* (2013.01); *G02F 1/134309* (2013.01); *G09G 2310/0237* (2013.01); *H04N 2213/001* (2013.01)

(58) Field of Classification Search
USPC ........ 348/E13.044, 59, E13.029, 51; 349/15, 349/200, 57, 33, 95, 139, 143, 187, 65, 349/37; 345/87, 204, 38, 99, 102, 103, 345/213, 80; 359/489.14, 642
See application file for complete search history.

(56) References Cited

U.S. PATENT DOCUMENTS

| 8,848,116 B2 | 9/2014 | He et al. |
| 2003/0063186 A1 | 4/2003 | Tomono |
| 2004/0169630 A1* | 9/2004 | Ide .................... G02F 1/134309 345/96 |
| 2007/0296911 A1 | 12/2007 | Hong |
| 2009/0122210 A1 | 5/2009 | Im |
| 2011/0157260 A1 | 6/2011 | Pyun et al. |
| 2011/0157497 A1 | 6/2011 | Kim |
| 2011/0228181 A1 | 9/2011 | Jeong et al. |

OTHER PUBLICATIONS

Hong, Hyun-Ki, et al., "25.3: Autostereoscopic 2D/3D Switching Display Using Electric-Field-Driven LC Lens (ELC Lens)," SID 08 Digest, Korea.
Non-Final Office Action dated Nov. 19, 2014, in U.S. Appl. No. 13/690,549.
Notice of Allowance dated Mar. 2, 2015, in U.S. Appl. No. 13/690,549.

* cited by examiner

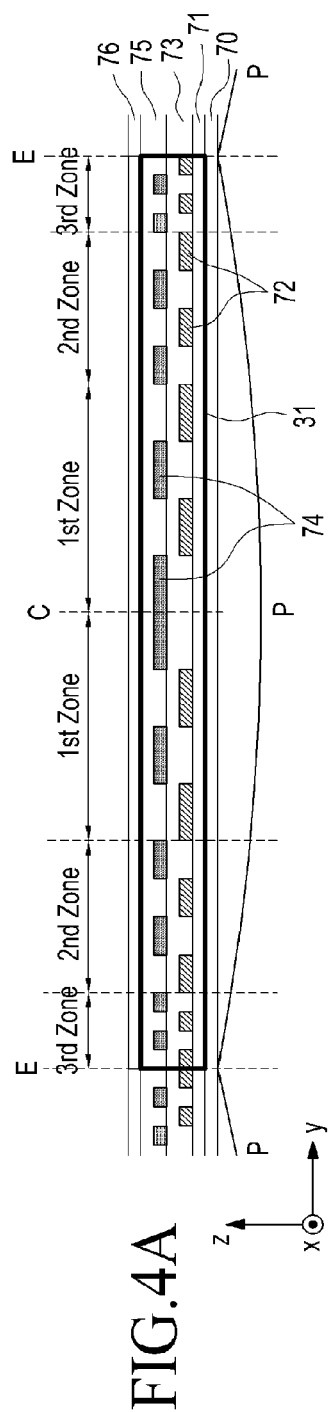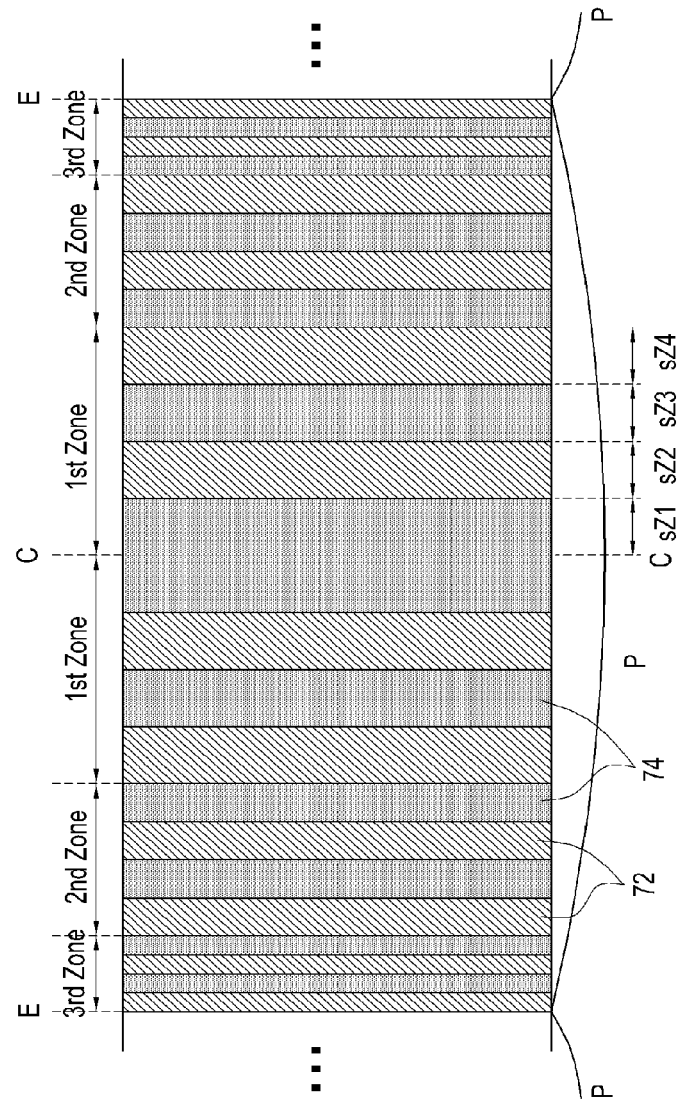
FIG.4A
FIG.4B

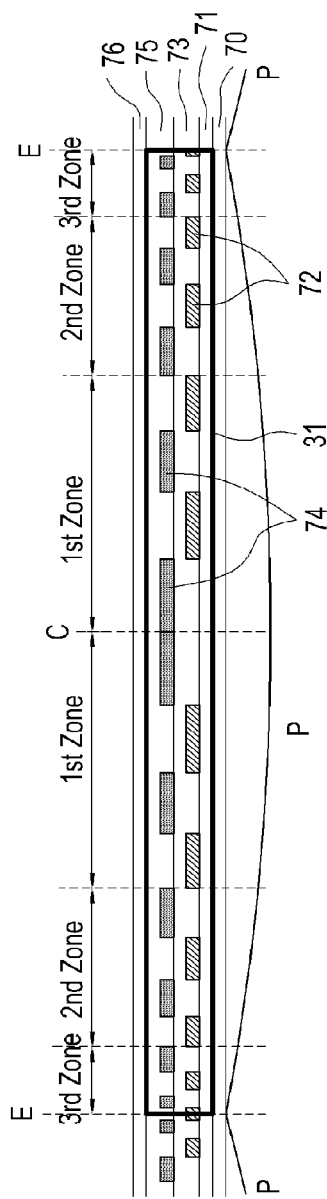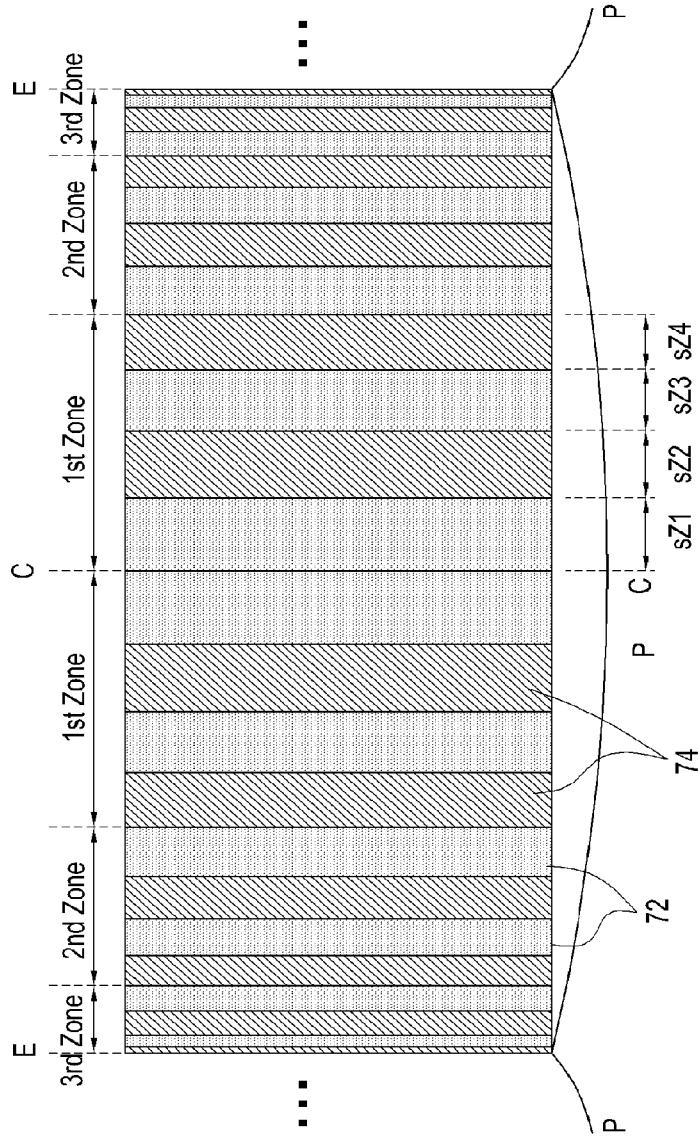
FIG.5A
FIG.5B

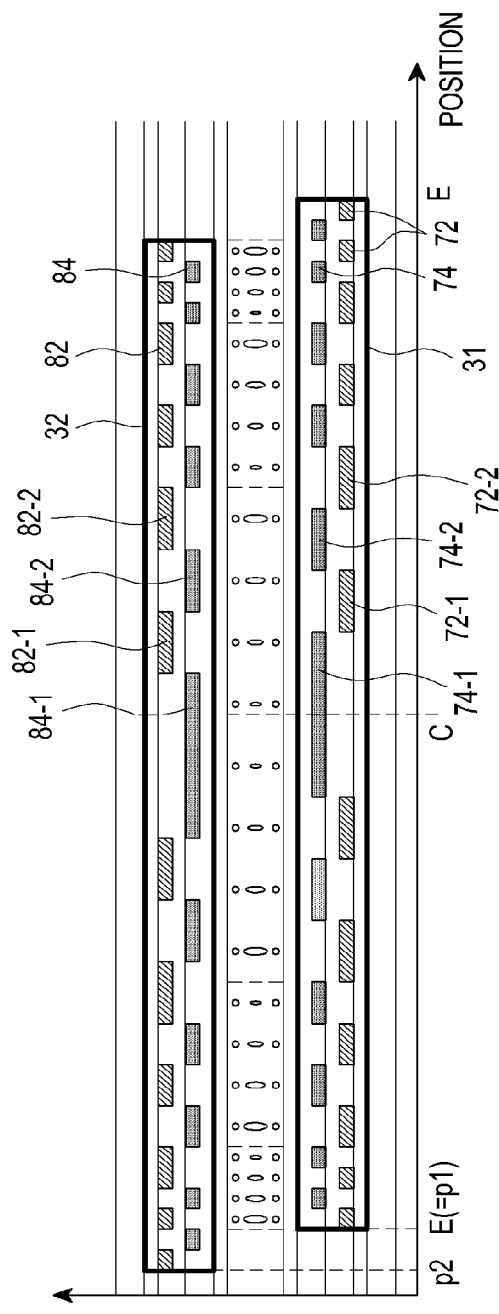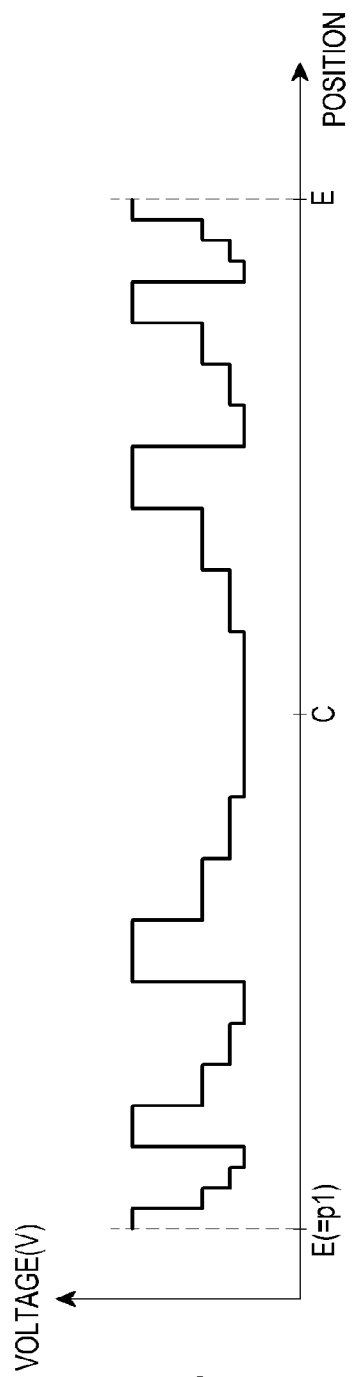
FIG.6A
FIG.6B

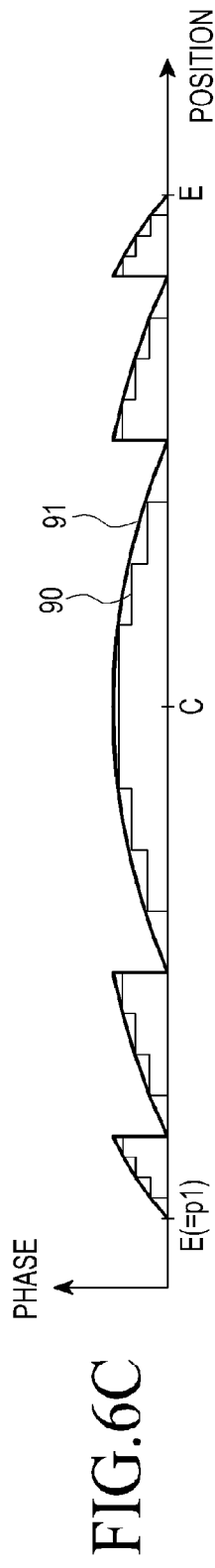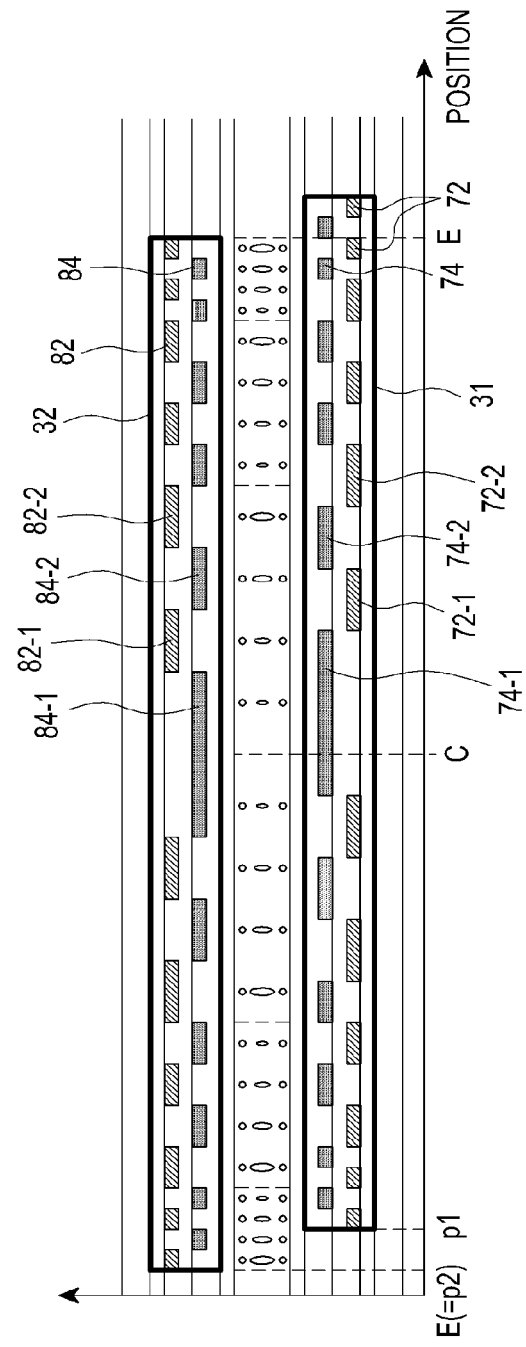

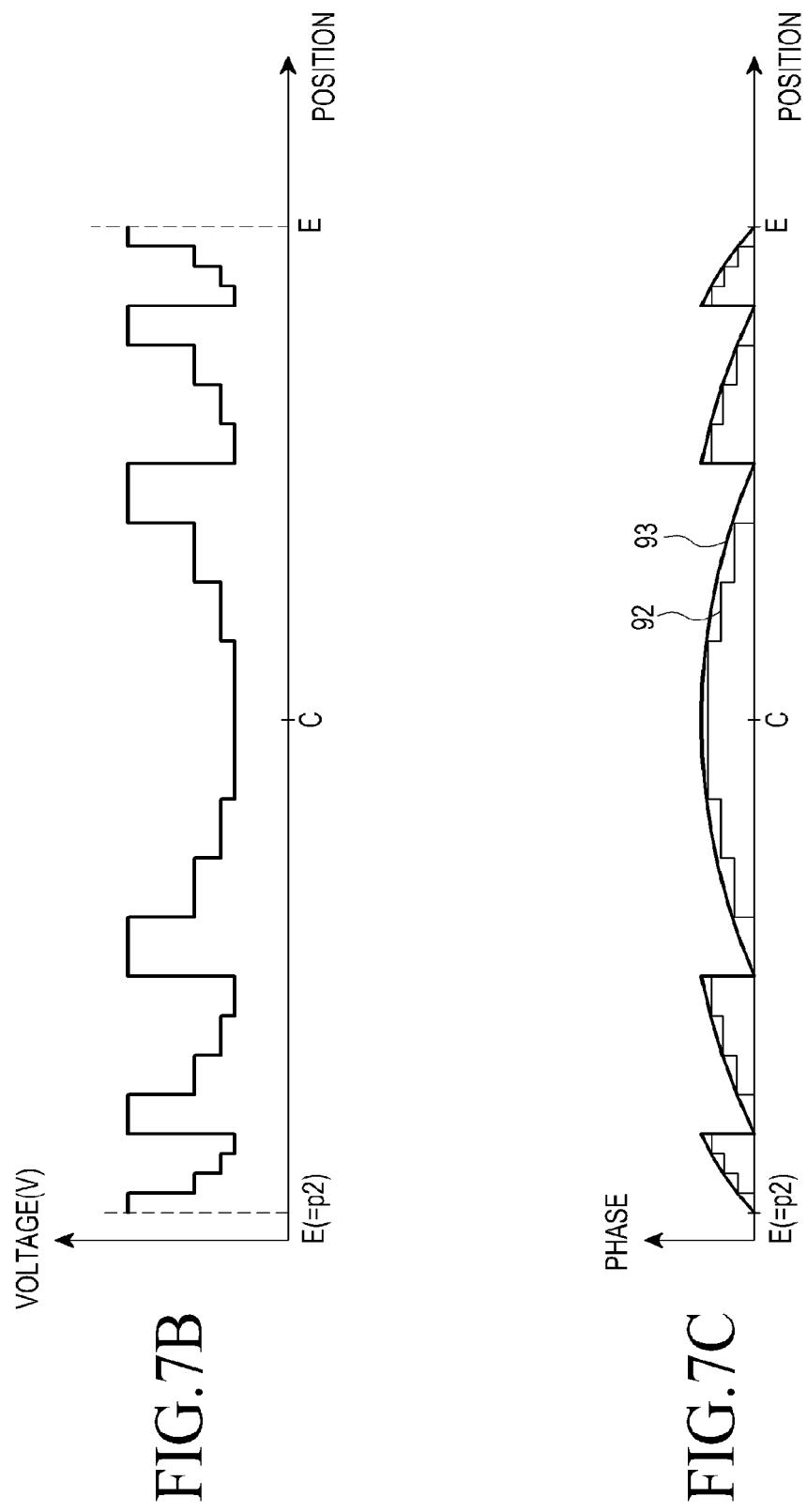

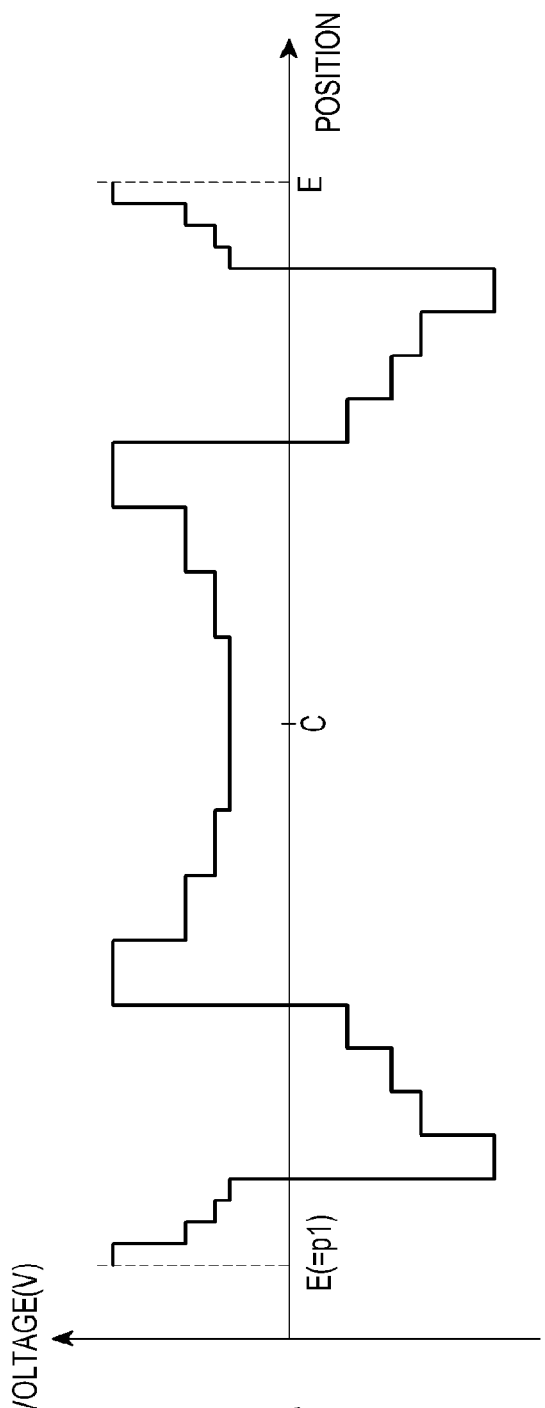
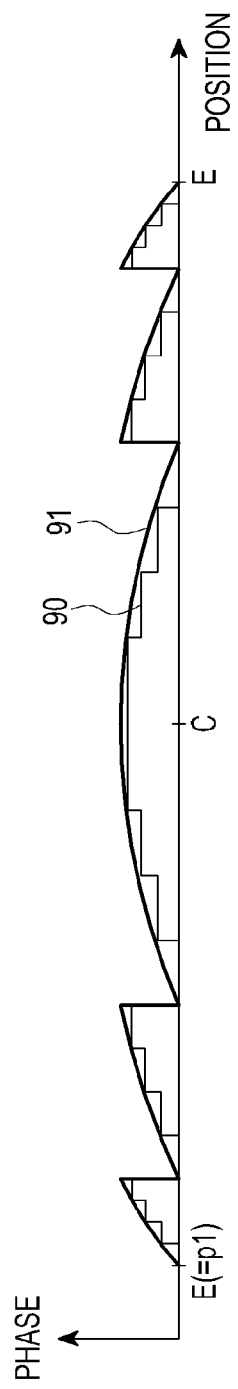
FIG.8B
FIG.8C

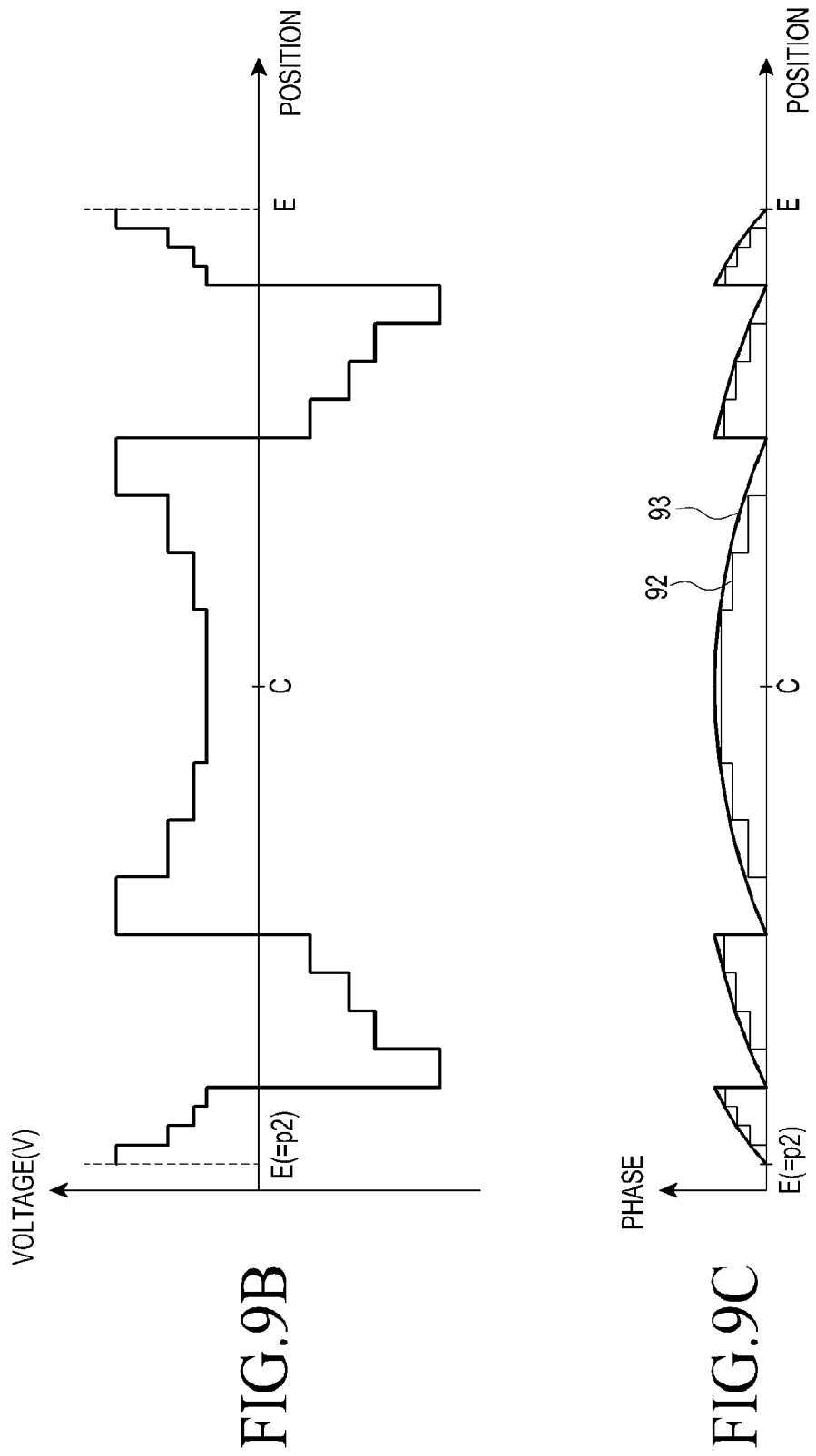

TWO-DIMENSIONAL/THREE-DIMENSIONAL SWITCHABLE DISPLAY APPARATUS

CROSS-REFERENCE TO RELATED APPLICATIONS

This application is a Divisional of U.S. patent application Ser. No. 13/690,549, filed on Nov. 30, 2012, which claims priority from and the benefit of Korean Patent Application No. 10-2011-0126799, filed on Nov. 30, 2011, each of which is incorporated by reference for all purposes as if set forth herein.

BACKGROUND

Field

The present disclosure relates to display technology, and more particularly, to two-dimensional/three-dimensional switchable autostereoscopic display technology.

Discussion

Three dimensional (3D) display technologies may be classified into two general categories, i.e., stereoscopic and autostereoscopic display technologies. Conventional stereoscopic display technologies create (or otherwise enhance) the illusion of depth by presenting offset images exhibiting a binocular disparity to respective left-eyes and right-eyes of viewers. In this manner, respective two-dimensional (2D) retinal images may be perceived by the left-eye and right-eye of a viewer, such that the respective 2D retinal images may be autonomically combined to create the perception of a 3D image.

Traditionally, stereoscopic display technologies have mechanically presented the 2D images to viewers, such that the viewers are required to utilize headgear, such as polarizing glasses, to either combine separate 2D images from two offset sources or to separate a left-eye image and a right-eye image from a single source. For instance, liquid crystal shutter glasses may be utilized, in which left-eye and right-eye liquid crystal shutters alternately pass and block light at stated periods to separate respective 2D images. In this manner, a shutter glass driving device is typically utilized to drive the liquid crystal shutter glasses. While certainly effective, such requirements may leave viewers feeling inconvenienced by the necessity to wear such polarizing glasses or any "other" headgear, as well as present a less cost-effective solution as the liquid crystal shutter glasses and associated devices increase the cost of ownership.

Autostereoscopic display technologies; however, are capable of respectively presenting images directionally to the left eye and right eye of a viewer, such that the viewer is not necessarily required to wear any polarizing glasses or any "other" headgear to benefit from the binocular perception of depth. For example, autostereoscopic display technology may include a parallax barrier 3D display device and a lenticular 3D display device. The parallax barrier 3D display device provides a parallax barrier with apertures in the form of a vertical grid, which is mounted in front of a display panel including pixels arranged in rows and columns. The parallax barrier separates left-eye images from right-eye images and, thereby, enables a binocular disparity between the respective images on the display panel. Lenticular 3D display devices generally utilize a lenticular lens including a columnar array of semi-cylindrical lenses, which is disposed on a display panel, instead of using the parallax barrier in the form of a vertical grid. In this manner, the curvature of individual lenticules enables left-eye images to be directionally transmitted to the left-eyes of viewers and right-eye images to be directionally transmitted to the right-eyes of viewers.

An autostereoscopic 2D/3D switchable liquid crystal display (LCD) apparatus includes a liquid crystal lens, which may be configured to provide a lenticular lens depending on changes in refractive index of the liquid crystal material included between its upper and lower substrates. The liquid crystal lens is typically mounted in front of a display panel, and may switch between 2D and 3D display modes depending on whether or not the lens is activated via one or more driving electrodes. For example, in the 2D display mode, voltage applied between the driving electrodes may be turned off so that the liquid crystal can maintain its initial alignment state. As such, light propagating from the display panel may be provided to viewers as 2D images, which propagate through the liquid crystal lens without undergoing substantial directional changes. In the 3D display mode, however, voltage may be applied between the driving electrodes so that the liquid crystal lens may be configured as a lenticular lens. Namely, the refractive indices of the liquid crystal molecules may be changed depending on the positions of the liquid crystal molecules in a direction parallel to the upper and lower substrates bounding the liquid crystal material. As such, light propagating from the display panel may be directionally bent while propagating through the liquid crystal lens and, thereby, enables left-eye images and right eye-images to be directionally transmitted to the left-eyes and right-eyes of viewers. This enables viewers to benefit from the binocular perception of depth without necessarily wearing any polarizing glasses or any "other" headgear.

One challenge associated with autostereoscopic display technologies is enabling multiple vantage points to, thereby, enable a plurality of viewers to enjoy the 3D images irrespective of their viewing position. Generally, however, when providing a plurality of 3D views via a single screen, the display of as many different images as the number of views to be provided can cause a decrease in horizontal resolution inversely proportion to the number of views to be provided. For example, conventional 3D display devices supporting eight different views may have its horizontal resolution reduced to ⅛ of the horizontal resolution associated with of the display of 2D images.

Therefore, there is a need for an approach that provides effective, cost-efficient autostereoscopic display technologies that are capable of providing multiple vantage points at sufficient levels of resolution.

The above information disclosed in this Background section is only for enhancement of understanding of the background of the invention and, therefore, it may contain information that does not form any part of the prior art nor what the prior art may suggest to a person of ordinary skill in the art.

SUMMARY

Exemplary embodiments provide a 2D/3D switchable liquid crystal lens, a display apparatus configured to provide multiple vantage points at sufficient levels of resolution, and a method to drive the same.

Exemplary embodiments provide a liquid crystal lens suitable for time-division driving, as well as a 2D/3D switchable display apparatus incorporating the liquid crystal lens and a method to drive the same.

Exemplary embodiments provide a 2D/3D switchable liquid crystal lens, display apparatus configured including reduced thickness, while maintaining high-quality 3D images, and a method to drive the same.

Additional aspects will be set forth in the detailed description which follows and, in part, will be apparent from the disclosure, or may be learned by practice of the invention.

According to exemplary embodiments, a two-dimensional/three-dimensional (2D/3D) switchable display apparatus, includes: a display panel; a first substrate disposed on the display panel; a first electrode layer disposed on a surface of the first substrate, the first electrode layer including a plurality of first electrodes; a second substrate disposed on the first substrate; a second electrode layer disposed on a surface of the second substrate, the second electrode layer including a plurality of second electrodes; and a liquid crystal layer disposed between the first substrate and the second substrate. A plurality of lens units are formed in association with a first position of the liquid crystal layer when a lens forming voltage profile is applied to the plurality of first electrodes and a common voltage is applied to the plurality of second electrodes. When the common voltage is applied to the plurality of first electrodes and the lens forming voltage is applied to the plurality of second electrodes, the plurality of lens units are formed in association with a second position spaced apart from the first position. The plurality of first electrodes and the plurality of second electrodes comprise variously shaped electrodes.

According to exemplary embodiments, a two-dimensional/three-dimensional (2D/3D) switchable display apparatus, includes: a display panel; a first substrate disposed on the display panel; a first electrode layer disposed on a surface of the first substrate, the first electrode layer including a plurality of first electrodes; a second substrate disposed on the first substrate; a second electrode layer disposed on a surface of the second substrate, the second electrode layer including a plurality of second electrodes; a liquid crystal layer disposed between the first substrate and the second substrate; and a driver configured to cause, at least in part: a plurality of lens units to be formed in association with a first position of the liquid crystal layer in a first period, and the plurality of lens units to be formed in association with a second position spaced apart from the first position in a second period.

According to exemplary embodiments, a two-dimensional/three-dimensional (2D/3D) switchable display apparatus, includes: a liquid crystal panel including a plurality of pixels disposed in a matrix of rows and columns, the plurality of pixels being configured to display a first-view frame at least twice and to display a second-view frame at least twice; a liquid crystal lens, including: a first electrode layer, a second electrode layer, and a liquid crystal layer disposed between the first electrode layer and the second electrode layer, wherein a first lens forming voltage profile is caused, at least in part, to be applied to the first electrode layer and the second electrode layer to form a first lens associated with a first position of the liquid crystal layer in association with display of the first-view frames, and a second lens forming voltage profile is caused, at least in part, to be applied to the first electrode layer and the second electrode layer to form a second lens associated with a second position of the liquid crystal layer in association with display of the second view-frames; and a back light unit configured to be turned off in association with the first display of the first-view frames and the second-view frames, and to be turned on in association with at least a portion of the second display of the first view-frames and the second-view frames.

According to exemplary embodiments, a liquid crystal lens, includes: a first substrate; a second substrate; a liquid crystal layer including liquid crystal molecules disposed between the first substrate and the second substrate; a plurality of first electrodes disposed on the first substrate and being substantially parallel, the plurality of first electrodes being divided into a plurality of first units; and a plurality of second electrodes disposed on the second substrate and being substantially parallel, the plurality of second electrodes being divided into a plurality of second units, respective ones of the plurality of second units are correspondingly spaced apart from respective ones of the plurality of first units.

According to exemplary embodiments, a liquid crystal lens, includes a first electrode layer disposed on a first substrate; a second electrode layer disposed on a second substrate; and a liquid crystal layer disposed between the first electrode layer and the second electrode layer. A first-view frame is caused, at least in part, to be displayed via the liquid crystal lens in association with a first lens forming voltage profile being applied to the first electrode layer and the second electrode layer, the first lens forming voltage profile being configured to form a first lens via the liquid crystal layer, and a second-view frame is caused, at least in part, to be displayed via the liquid crystal lens in association with a second lens forming voltage profile being applied to the first electrode layer and the second electrode layer, the second lens forming voltage profile being configured to form a second lens via the liquid crystal layer.

According to exemplary embodiments, a display device driving method, includes: causing, at least in part, a liquid crystal layer to be switched from a two-dimensional display mode to a three-dimensional display mode; receiving image data associated with the three-dimensional display mode; causing, at least in part, a first plurality of electrodes disposed on the liquid crystal layer to be driven in association with a voltage profile based on the image data and a second plurality of electrodes disposed on the liquid crystal layer to be driven in association with a common voltage, the first plurality of driven electrodes being configured to cause the liquid crystal layer to form a plurality of lens units in association with a first position of the liquid crystal layer; and causing, at least in part, the second plurality of electrodes to be driven in association with the voltage profile based on the image data and the first plurality of electrodes to be driven in association with the common voltage, the second plurality of driven electrodes being configured to cause the liquid crystal layer to form the plurality of lens units in association with a second position of the liquid crystal layer.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIGS. 4A and 4B are, respectively, a cross-sectional view and a plan view of a lower electrode layer configured to drive a liquid crystal lens, according to exemplary embodiments.

FIGS. 5A and 5B are, respectively, a cross-sectional view and a plan view of a lower electrode layer configured to drive a liquid crystal lens, according to exemplary embodiments.

FIGS. 6A to 6C demonstrate application of voltage to enable a liquid crystal lens to provide a Fresnel zone plate in association with a 3D display mode, in which phase retardation is enabled via application of a lens forming voltage to a lower electrode layer of the liquid crystal lens and application of a common voltage to an upper electrode layer of the liquid crystal lens, according to exemplary embodiments.

FIGS. 7A to 7C demonstrate application of voltage to enable a liquid crystal lens to provide a Fresnel zone plate in association with 3D display mode, in which phase retardation is enabled via application of a lens forming voltage to an upper electrode layer of the liquid crystal lens and application of a common voltage to a lower electrode layer of the liquid crystal lens, according to exemplary embodiments.

FIGS. 8A to 8C demonstrate application of voltage to enable a liquid crystal lens to provide a Fresnel zone plate in association with a 3D display mode, in which phase retardation is enabled via application of a lens forming voltage to a lower electrode layer of the liquid crystal lens and application of a common voltage to an upper electrode layer of the liquid crystal lens, according to exemplary embodiments.

FIGS. 9A to 9C demonstrate application of voltage to enable a liquid crystal lens to provide a Fresnel zone plate in association with a 3D display mode, in which phase retardation is enabled via application of a lens forming voltage to a plurality of upper electrode layers of the liquid crystal lens and application of a common voltage to a plurality of lower electrode layers of the liquid crystal lens, according to exemplary embodiments.

DETAILED DESCRIPTION

Figure 1:
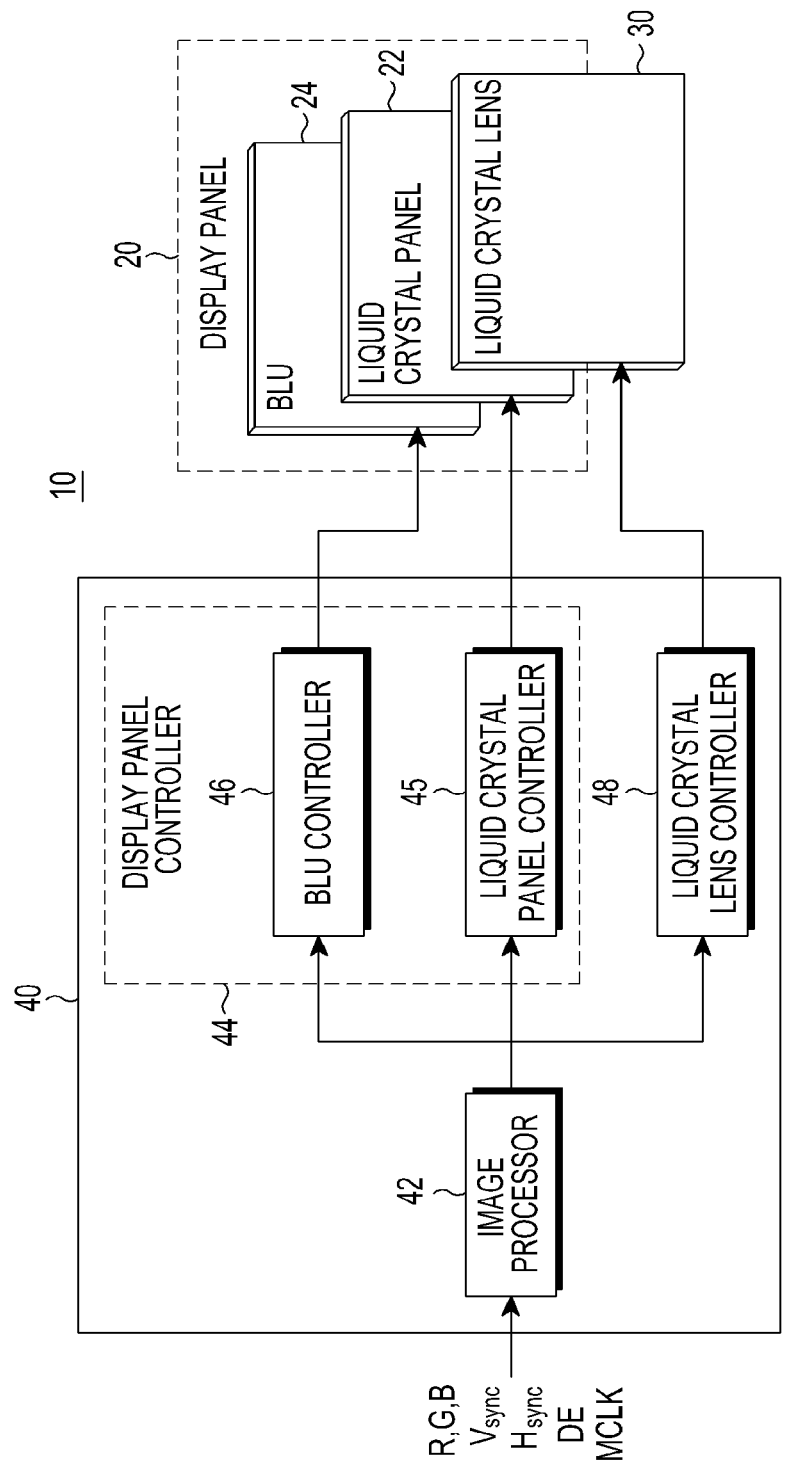
FIG. 1 is a block diagram of a 2D/3D switchable display apparatus, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers and/or regions may be exaggerated for clarity and descriptive purposes. Also, like reference numerals denote like elements.

When an element or layer is referred to as being "on," "connected to," or "coupled to" another element or layer, it may be directly on, directly connected to, or directly coupled to the other element or layer, or intervening elements or layers may be present. When, however, an element is referred to as being "directly on," "directly connected to," or "directly coupled to" another element or layer, there are no intervening elements or layers present. For the purposes of this disclosure, "at least one of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section that is discussed below may be termed a second element, component, region, layer, or section without departing from the teachings of the present invention.

Spatially relative terms, such as "beneath," "below," "lower," "above," "upper," and/or the like, may be used herein for descriptive purposes and, thereby, to describe one element or feature's relationship to another element(s) or feature(s) as illustrated in the drawings.

Spatially relative terms are intended to encompass different orientations of an apparatus in use or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations) and, as such, the spatially relative descriptors used herein are to be interpreted accordingly.

The terminology used herein is for the purpose of describing particular embodiments only and is not intended to be limiting. As used herein, the singular forms "a," "an," and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Although exemplary embodiments are described in association with liquid crystal display (LCD) technology, it is contemplated that exemplary embodiments are applicable to other display technology, such as one or more self-emissive or non-self-emissive display technology, e.g., cathode ray tubes (CRTs), electrophoretic displays (EPDs), electrowetting displays (EWs), plasma display panels (PDPs), organic light emitting diodes (OLEDs), field emission displays (FEDs), and/or the like.

FIG. 1 is a block diagram of a 2D/3D switchable display apparatus, according to exemplary embodiments.

As seen in FIG. 1, a 2D/3D switchable display apparatus ("display apparatus) 10 includes a display panel 20 configured to display images and a liquid crystal lens 30 disposed on the display panel 20 and configured to enable display apparatus 10 to be switched between 2D and 3D display modes. The display apparatus 10 also includes driver 40, which is configured to control (e.g., drive and/or configure) display panel 20 and liquid crystal lens 30. While specific reference will be made to this particular implementation, it is also contemplated that the display apparatus may embody many forms and include multiple and/or alternative components or features. For example, it is contemplated that the components of the display apparatus may be combined, located in separate structures, and/or separate locations.

According to exemplary embodiments, display panel 20 generally includes a plurality of pixels (not shown) arranged in, for example, a matrix formation characterized by a number of rows and columns. In this manner, display panel 20 may be configured to display images via the plurality of pixels.

For example, display panel 20 may include liquid crystal panel 22, which may include liquid crystal material disposed between two parallel (or substantially parallel) transparent substrates (not illustrated) that are spaced apart from one another. While exemplary embodiments are described in association with two transparent substrates (e.g., a first (or "lower") substrate and a second (or "upper") substrate), it is contemplated that any number of substrates may be utilized. To this end, a plurality of thin film transistors (TFTs) (not shown) may be disposed on a first surface (e.g., a front or inner surface) of a lower substrate in correspondence with the plurality of pixels. Components of the TFTs, e.g., gates and sources, may be respectively connected to gate lines (not illustrated) and data lines (not shown) associated with corresponding rows and columns of the matrix formation, whereas other components of the TFTs, e.g., drains, may be connected to one or more pixel electrodes. Further, a color filter (not shown) and a black matrix (not illustrated) may be disposed on a first surface (e.g., a front or inner surface) of an upper substrate.

Back light unit 24 may be configured to irradiate light (or any other suitable source radiation) towards liquid crystal panel 22, e.g., towards a back side of liquid crystal panel 22. To this end, changes in alignment of the liquid crystal molecules (or changes in refractive indices of the liquid crystal itself) may be utilized to modulate transmission of the irradiated light to, thereby, form images via the plurality of pixels. These changes in alignment or refractive indices may be caused via application of voltage between one or more common electrodes (not shown) and one or more pixel electrodes (not illustrated) associated with liquid crystal panel 22.

According to exemplary embodiments, the liquid crystal lens 30 may be configured to act as a "switch" to enable toggling between 2D and 3D display modes, such as in accordance with the application of one or more lens forming voltages applied thereto. For instance, one or more "on" lens forming voltages may be applied in association with a 3D display mode, whereas the 2D display mode may be associated with the absence of the application of the aforementioned lens forming voltage(s). It is contemplated, however, that different voltage levels may be utilized to toggle between the 2D and 3D display modes and, thereby, associated with the respective 2D and 3D display modes. Furthermore, differing lens forming voltage(s) may be utilized in association with one or more sub-display modes of the 2D and 3D display modes.

In exemplary embodiments, the 2D display mode may be associated with, for instance, the liquid crystal lens 30 being configured as a light transmitting component, such that light propagating from the display panel 20 is provided at least one viewer in association with one or more 2D images propagating through the liquid crystal lens 30 without substantial changes in directional propagation. In association with the 3D display mode, however, the liquid crystal lens 30 may be configured as a lenticular lens. For example, light propagating from the display panel 20 may be directional bent while propagating through the liquid crystal lens 30 to, thereby, provide different images to viewers, e.g., left-eye and right-eye images, so that the viewers may autonomically combine the respective 2D left-eye and right-eye images to create the perception of depth (or 3D images), without necessitating the use of polarizing glasses or any "other" headgear.

As previously mentioned, display apparatus 10 may also include driver 40, which may be configured to control (e.g., drive and/or configure) the display panel 20 and the liquid crystal lens 30. The driver 40 may include an image processor 42, a display panel controller 44, and a liquid crystal lens controller 48. In exemplary embodiments, the image processor 42, display panel controller 44, and liquid crystal lens controller 48 may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

The image processor 42 may be configured to receive image data RGB associated with 2D/3D images, as well as one or more other signals, e.g., a vertical synchronization signal Vsync, a horizontal synchronization signal Hsync, a main clock MCLK, a data enable signal DE from, for instance, an internal or external source (e.g., an external host system, personal computer (PC), broadcast provider, etc.), etc., to enable presentation of one or more 2D/3D images via display panel 20 and liquid crystal lens 30.

According to exemplary embodiments, the image processor 42 may be configured to transfer the image data RGB, the vertical synchronization signal Vsync, the horizontal synchronization signal Hsync, the main clock MCLK, the data enable signal DE, etc., to the display panel controller 44. The display panel controller 44 is configured to generate a gate line driving voltage(s) and a data line driving voltage(s), which may be utilized to drive the display panel 20 in association with the received image data RGB and the received signals. To this end, the display panel controller may be further configured to control image display via the display panel 20 based on the above-noted driving voltages. It is noted that while a gate line driving voltage and a data line driving voltage are described in association with exemplary embodiments, it is contemplated that one or more voltage profiles may be applied to the electrodes. In this manner, the voltage profiles may vary, such as, in accordance with, a dimension of the corresponding display apparatus, e.g., along a first or second horizontal direction, as will become more apparent below, such as, in association with, the description accompanying FIGS. 6B, 7B, 8B, and 9B.

The display panel controller 44 may include a liquid crystal panel controller 45 and a back light unit (BLU) controller 46.

Accordingly, the image processor 42 may be configured to provide the image data RGB, the vertical synchronization signal Vsync, the horizontal synchronization signal Hsync, the main clock MCLK, the data enable signal DE, etc., to the liquid crystal panel controller 45. The liquid crystal panel controller 45 may be configured to control image display via the liquid crystal panel 22 based on the received image data RGB and the various other received signals.

The image processor 42 may also be configured to provide the BLU controller 46 with a back light control signal to enable the back light unit (BLU) 24 to be driven at different luminance levels depending on the 2D/3D display modes and/or the received image data RGB, the various other received signals, etc. For example, the back light control signal may be utilized to drive the BLU 24 at (or near) 100% luminance of the BLU 24 in association with the 2D display mode, and drive the BLU 24 at (or near) 150% to 200% luminance of the BLU 24 in association with the 3D display mode. To this end, the back light control signal may also be utilized in association with turning on/off the BLU 24.

According to exemplary embodiments, the image processor 42 may also be configured to provide a lens driving control signal(s) to the liquid crystal lens controller 48. The liquid crystal lens controller 48 may apply or not apply a voltage to one or more electrodes of the liquid crystal lens 30 depending on the lens driving control signal. For example, in association with the 2D display mode, the liquid crystal lens controller 48 may be configured to apply no voltage to the various electrodes associated with the liquid crystal lens 30 depending on the lens driving control signal. In this manner, the liquid crystal lens 30 may be configured as a light transmitting component and, thereby, not include individual lens unit formations. In association with the 3D display mode, however, the liquid crystal lens controller 48 may be configured to apply a lens forming voltage(s) and a common voltage(s) to one or more upper and lower electrodes of the liquid crystal lens 30, based on the lens driving control signal(s). For example, a lens forming voltage may be applied to an upper electrode, whereas a common voltage may be applied to a lower electrode, or vice versa. In this manner, the liquid crystal lens 30 may be dynamically configured, such as toggled between 2D and 3D modes, e.g., excited so that a plurality of lens units (e.g., lenticules) are formed, as will become more apparent below.

Figure 2:
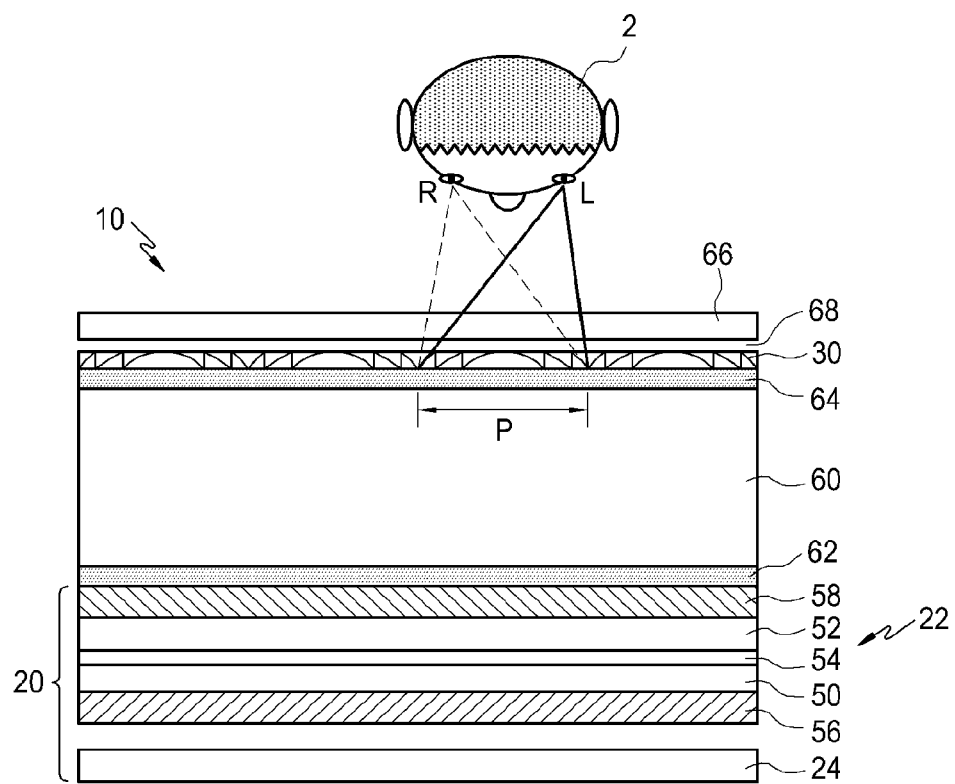
FIG. 2 is a cross-sectional view of a 2D/3D switchable display apparatus, according to exemplary embodiments.

FIG. 2 is a cross-sectional view of a 2D/3D switchable display apparatus, according to exemplary embodiments.

As seen in FIG. 2, the display apparatus 10 includes a display panel 20 and a liquid crystal lens 30 disposed on (e.g., over) the display panel 20.

The display panel 20 may include, for example, a liquid crystal panel 22 and a back light unit 24.

While not illustrated, the display panel 20 may be generally configured to include a plurality of pixels arranged in, for instance, a matrix formation characterized by a number of rows and columns. Further, the display panel 20 may include a pair of transparent substrates 50 and 52, which may be spaced apart and parallel (or substantially parallel) to one another. One or more liquid crystal materials 54 may be disposed between the substrates 50 and 52. To this end, a plurality of TFTs (not shown) may be formed on a first (e.g., front or inner surface) of the lower substrate 50 in correspondence with the plurality of pixels. A color filter (not shown) and a black matrix (not illustrated) may be formed on the upper substrate 52.

Polarizers 56 and 58 may be disposed on the lower substrate 50 and the upper substrate 52, respectively. The polarizers 56 and 58 may be configured to pass or transmit polarized components of light (or other source radiation) in corresponding specific (e.g., predetermined) directions as the light propagates through the liquid crystal panel 22.

In exemplary embodiments, the liquid crystal lens 30 is spaced apart from the liquid crystal panel 22 based on a focal length of liquid crystal lens 30. Accordingly, a gap spacing layer may be disposed between the liquid crystal lens 30 and the liquid crystal panel 22. The gap spacing layer may be formed as a gap spacing plate 60 manufactured from, for instance, one or more transparent glass, plastic, etc., materials. The gap spacing plate 60 may be formed thick enough to maintain a focal length between one or more lens units formed via the liquid crystal lens 30 and the plurality of pixels disposed on the liquid crystal panel 22. According to exemplary embodiments, the lens units may be formed including the same width (e.g., pitch P) and disposed parallel (or substantially parallel) to one another, such as, for example, in a horizontal direction extending parallel (or substantially parallel) to a surface of transparent substrates 50 and 52.

The bottom surface of the gap spacing plate 60 may be coupled to a surface (e.g., top surface) of the liquid crystal panel 22 via an optical adhesive 62. To this end, an opposing surface (e.g., top surface) of gap spacing plate 60 may be coupled to a corresponding surface (e.g., bottom surface) of the liquid crystal lens 30 via an optical adhesive 64. The optical adhesives 62 and 64 may be an optically transparent material adhesive characterized by a refractive index substantially similar to that of the liquid crystal panel 22, the gap spacing plate 60, and the liquid crystal lens 30. In other words, the respective refractive indices of liquid crystal panel 22, gap spacing plate 60, liquid crystal lens 30, and optical adhesives 62, 64 may not be substantially different from one another. It is noted, however, that the refractive index of liquid crystal lens 30 may be caused to be different from that of the other above-noted components, such as in association with a 3D display mode of display apparatus 10.

According to exemplary embodiments, a cover plate 66 (e.g., a glass cover plate) may be disposed on a surface (e.g., top surface) of the liquid crystal lens 30 to, for instance, protect the liquid crystal lens 30 from external conditions, e.g., moisture, particulate accumulation, temperature, etc.

The cover plate 66 may be formed of tempered glass and, thereby, be a glass cover plate 66.

A gap 68 (such as an air gap) may be disposed between the liquid crystal lens 30 and the cover plate 66. It is contemplated that gap 68 may be held under pressure, whether positive or negative, as well as filled with one or more (or no) gasses. In exemplary embodiments, gap 68 may be configured to space cover plate 66 from liquid crystal lens 30 by 5 or more millimeters; however, any suitable spacing may be utilized.

Figure 3:
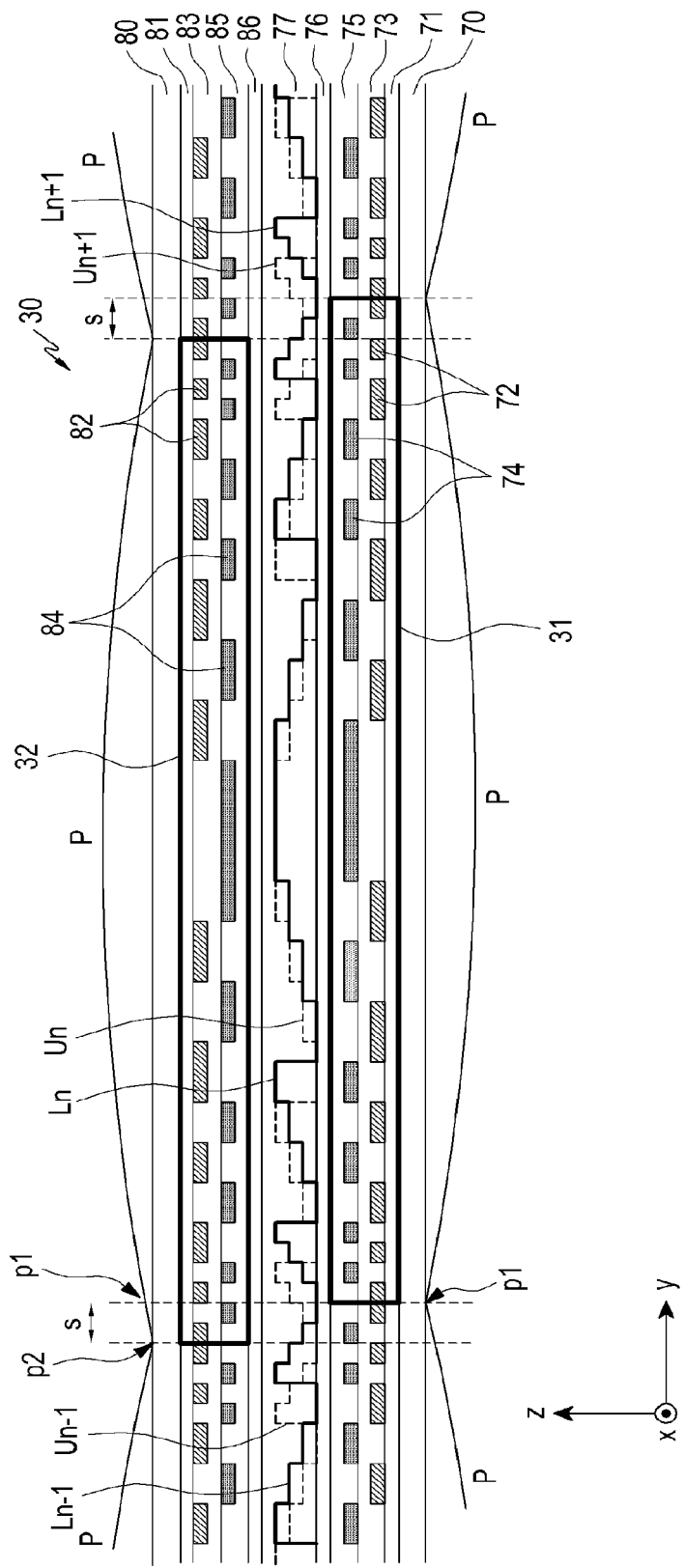
FIG. 3 is an elevation view of a liquid crystal lens, according to exemplary embodiments.

FIG. 3 is an elevation view of a liquid crystal lens, according to exemplary embodiments.

As seen in FIG. 3, a liquid crystal lens 30 includes a first (or lower) substrate 70, a second (or upper) substrate 80, and a liquid crystal layer 77 disposed between the first substrate 70 and the second substrate 80. While specific reference will be made to this particular implementation, it is also contemplated that liquid crystal lens 30 may embody many forms and include multiple and/or alternative components.

The first substrate 70 may be manufactured from (or include) transparent glass or plastic. To this end, lower electrode layers 72 and 74 may be disposed on a surface (e.g., top surface) of first substrate 70. The lower electrode layers 72 and 74 may be patterned according to one or more predetermined pattern formations.

According to exemplary embodiments, the lower electrode layers 72 and 74 include a plurality of first lower electrodes 72 and a plurality of second lower electrodes 74. The first and second lower electrodes 72 and 74 may be disposed on different layers in the vertical direction (e.g., z-axis direction). It is contemplated, however, that the first and second lower electrodes 72 and 74 may be disposed on or within the same layer. The first and second lower electrodes 72 and 74 may be stripe-shaped; however, any other suitable formation is contemplated.

A first insulating layer 71 may be disposed on the first substrate 70, and the first lower electrodes 72 may be formed on the insulating layer 71. A second insulating layer 73 may be formed on the first lower electrodes 72, and the second lower electrode layers 74 may be disposed on the insulating layer 73. A third insulating layer 75 may be disposed on the second lower electrodes 74, and a first alignment layer 76 may be disposed on the third insulating layer 75. Accordingly, the first lower electrodes 72 may be disposed on the first substrate 70 with the first insulating layer 71 disposed therebetween. The second lower electrodes 74 may be disposed on the first lower electrodes 72 with the second insulating layer 73 disposed therebetween. In this manner, the first and second lower electrodes 72 and 74 may be spaced apart from one another in the vertical direction (e.g., z-axis direction).

The insulating layers 71, 73, and 75 may be made of one or more inorganic insulating materials, organic insulating materials, and/or organic/inorganic insulating materials. Inorganic insulating materials may include silicon nitride ($SiN_x$), silicon oxide ($SiO_x$), titanium oxide ($TiO_2$), alumina ($Al_2O_3$), zirconia ($ZrO_2$), etc. The organic insulating material may include poly siloxane, phenyl siloxane, polyimide, silsesquioxane, silane, etc.

The first lower electrodes 72 may be a plurality of conductive lines formed via deposition of a transparent material, such as aluminum zinc oxide (AZO), gallium zinc oxide (GZO), indium tin oxide (ITO), indium zinc oxide (IZO), and/or the like, over a surface (e.g., top surface) of the first insulating layer 71 and patterning the deposited material in a first direction (e.g., x-axis direction) via any suitable patterning technique, e.g., via photolithography. The first lower electrodes 72 may be elongated in (or extend along) the first horizontal direction (e.g., x-axis direction), and may be disposed parallel to one another and, thereby, spaced apart from one another. The first lower electrodes 72 may be directly disposed on a surface (e.g., top surface) of the first substrate 70. To this end, the first horizontal direction (e.g., x-axis direction) may be tilted at an angle of θ from a column direction of the plurality of pixels disposed in, for instance, rows and columns in association with the liquid crystal panel 22. The tilt angle θ is defined as an angle between lens axes of lenticular lenses (e.g., semi-cylindrical lens units) disposed on the plurality of pixels disposed in rows and columns in association with the liquid crystal panel 22, and a column direction of the plurality of pixels. The tilt angle θ enables a plurality of views (or vantage points) in the direction of a row of the plurality of pixels and enables prevention of the degradation of image quality in association with the horizontal direction. Since the degradation of image quality in the vertical direction is less prone to being perceived by viewers than degradation of image quality in the horizontal direction, tilt angle θ may be utilized to improve degradation of image quality caused by or resulting from, for instance, color separation and moiré phenomena.

The second lower electrodes 74 may be a plurality of conductive lines formed via deposition of a transparent material, such as AZO, GZO, ITO, and IZO, and/or the like, over a surface (e.g., top surface) of the second insulating layer 73, which may be patterned in the first horizontal direction (e.g., x-axis direction) via any suitable patterning technique, e.g., via photolithography. The second lower electrodes 74 may be elongated in (or extend along) the first horizontal direction (e.g., x-axis direction), and may be disposed parallel to one another and, thereby, spaced apart from one another.

According to exemplary embodiments, the first and second lower electrodes 72 and 74 may be alternately disposed in a second horizontal direction (e.g., y-axis direction), which may be perpendicular (or substantially perpendicular) to the first horizontal direction. In this manner, individual first lower electrodes 72 may be disposed between corresponding second lower electrodes 74. The second horizontal direction (e.g., y-axis direction) may be a direction associated with the row direction of the plurality of pixels arranged in rows and columns in association with the liquid crystal panel 22.

Although it is shown in FIG. 3 that the first lower electrodes 72 do not overlap the second lower electrodes 74 in the vertical direction (e.g., z-axis direction), an edge portion of at least some of the first lower electrodes 72 may be configured to overlap the second lower electrodes 74 in the vertical direction (e.g., z-axis direction). If the lower electrodes 72 and 74 of two layers are arranged in a zigzag formation so that adjacent edges may overlap, a larger number of electrodes may be disposed on lower substrate 70. To this end, it is noted that as the number of lower electrodes 72 and 74 increases, a larger number of voltages may be applied in the second horizontal direction (e.g., y-axis direction), which eases the formation of a refractive index distribution via liquid crystal layer 77, such as in accordance with a desired lens type, e.g., a Fresnel lens type.

In exemplary embodiments, the first alignment layer 76 may be disposed on the third insulating layer 75. The first alignment layer 76 may be formed via application of a liquid organic material characterized by one or more alignment properties. For instance, the liquid organic material may be inkjet and/or roll printed on the third insulating layer 75. To this end, the applied liquid organic material may be cured via light (or any other suitable source radiation, such as infrared, ultraviolet, etc., radiation) and/or via temperature-based baking.

The second substrate 80 may be manufactured from (or include) transparent glass or plastic. To this end, upper electrode layers 82 and 84 may be disposed on a surface (e.g., top surface) of second substrate 80. The upper electrode layers 82 and 84 may be patterned according to one or more predetermined formations. For instance, the upper electrode layers 82 and 84 may be formed according to the same or different pattern as the lower electrode layers 72 and 74. To this end, it is contemplated that lower electrode layers 72 and 74 and upper electrode layers 82 and 84 may be formed including a plurality of patterns.

According to exemplary embodiments, the upper electrode layers 82 and 84 include a plurality of first upper electrodes 82 and a plurality of second upper electrodes 84. The first and second upper electrodes 82 and 84 may be disposed on different layers in the vertical direction (e.g., z-axis direction). It is contemplated, however, that the first and second lower electrodes 72 and 74 may be disposed on or within the same layer. The first and second upper electrodes 82 and 84 may be stripe-shaped; however, any other suitable formation is contemplated.

A fourth insulating layer 81 may be disposed on the second substrate 80, and the first upper electrodes 82 may be disposed on the fourth insulating layer 81. A fifth insulating layer 83 may be disposed on the first upper electrodes 82, and the second upper electrodes 84 may be disposed on the fifth insulating layer 83. A sixth insulating layer 85 may be disposed on the second upper electrodes 84, and a second alignment layer 86 may be disposed on the sixth insulating layer 85. Accordingly, the first upper electrodes 82 may be disposed on the second substrate 80 with the fourth insulating layer 81 disposed therebetween. The second upper electrodes 84 may be disposed on the first upper electrodes 82 with the fifth insulating layer 83 disposed therebetween. In this manner, the first and second upper electrodes 82 and 84 may be spaced apart from one another in the vertical direction (e.g., z-axis direction).

The insulating layers 81, 83, and 85 may be made of one or more inorganic insulating materials, organic insulating materials, and/or organic/inorganic insulating materials. For instance, the inorganic insulating materials may include silicon nitride (SiNx), silicon oxide (SiOx), titanium oxide ($TiO_2$), alumina ($Al_2O_3$), zirconia ($ZrO_2$), etc. The organic insulating materials may include poly siloxane, phenyl siloxane, polyimide, silsesquioxane, silane, etc.

The first upper electrodes 82 may be a plurality of conductive lines formed via deposition of a transparent material, such as AZO, GZO, ITO, and IZO, and/or the like, over a surface (e.g., top surface) of the fourth insulating layer 81. The deposited transparent material may be patterned in the first horizontal direction (e.g., x-axis direction) via any suitable patterning technique, such as, for instance, via photolithography. The first upper electrodes 82 may be elongated in (or extend along) the first horizontal direction (e.g., x-axis direction), and may be disposed parallel to one another and, thereby, spaced apart from one another. The first upper electrodes 82 may also be directly disposed on a surface (e.g., top surface) of the second substrate 80.

The second upper electrodes 84 may be a plurality of conductive lines formed via deposition of a transparent material, such as AZO, GZO, ITO, and IZO, and/or the like, over a surface (e.g., top surface) of the fifth insulating layer 83, which may be patterned in the first horizontal direction (e.g., x-axis direction) via any suitable patterning technique, e.g., via photolithography. The second upper electrodes 84 may be elongated in (or extend along) the first horizontal direction (e.g., x-axis direction), and may be disposed parallel to one another and, thereby, spaced apart from one another.

According to exemplary embodiments, the first and second upper electrodes 82 and 84 may be alternately disposed in the second horizontal direction (e.g., y-axis direction), which may be perpendicular (or substantially perpendicular) to the first horizontal direction. In this manner, individual first upper electrodes 82 may be disposed between corresponding second upper electrodes 84.

Although it is shown in FIG. 3 that the first upper electrodes 82 do not overlap the second upper electrodes 84 in the vertical direction (e.g., z-axis direction), an edge portion of at least some of the first upper electrodes 82 may be configured to overlap the second upper electrodes 84 in the vertical direction (e.g., z-axis direction). If the upper electrodes 82 and 84 of two layers are arranged in a zigzag formation so that adjacent edges may overlap, a larger number of electrodes may be disposed on upper substrate 80. To this end, it is noted that as the number of upper electrodes 82 and 84 increases, a larger number of voltages may be applied in the second horizontal direction (e.g., y-axis direction), which eases the formation of a refractive index distribution via liquid crystal layer 77, such as in accordance with a desired lens type, e.g., a Fresnel lens type.

In exemplary embodiments, the second alignment layer 86 may be disposed on the sixth insulating layer 85. The second alignment layer 86 may be formed via application of a liquid organic material characterized by one or more alignment properties. For instance, the liquid organic material may be inkjet and/or roll printed on the sixth insulating layer 85. To this end, the applied liquid organic material may be cured via light (or any other suitable source radiation, e.g., infrared, ultraviolet, etc., radiation) and/or via temperature baking.

According to exemplary embodiments, a liquid crystal material may be disposed between the first and second alignment layers 76 and 86 and, thereby, configured to form the liquid crystal layer 77. To this end, the first and second alignment layers 76 and 86 may be utilized to determine initial alignment characteristics of liquid crystal molecules associated with the liquid crystal layer 77. For example, the first alignment layer 76 may be rubbed in a "+x"-axis direction (e.g., a direction extending out of the page), and the second alignment layer 86 may be rubbed in a "−x"-axis direction (e.g., a direction extending in to the page). As such, liquid crystal molecules associated with the liquid crystal layer 77 may be aligned in an anti-parallel manner.

As shown in FIG. 3, the lower electrode layers 72 and 74 and the upper electrode layers 82 and 84 may be formed including a structure in which the same electrode patterns face each other. It is contemplated, however, that different structures may be associated with at least one of lower electrode layers 72 and 74 and/or upper electrode layers 82 and 84.

According to exemplary embodiments, the lower electrode layers 72 and 74 may be divided into a plurality of lower electrode groups, which may be connected to one another, such that each lower electrode group is configured to form a corresponding first lens unit when, for instance, voltage is applied to the grouped lower electrode 72 and 74. For example, a lower electrode group 31 may be configured to form a first lens unit Ln of the liquid crystal layer 77. To this end, lower electrode groups at either side of the lower electrode group 31 may be configured to form first lens units Ln−1 and Ln+1, respectively. It is contemplated that the lower electrode groups are configured to form the same electrode pattern; however, it is also contemplated that different electrode patterns may be utilized.

The upper electrode layers 82 and 84 may be divided into a plurality of upper electrode groups, which may be connected to one another, such that each upper electrode group is configured to form a corresponding second lens unit when, for instance, voltage is applied to the grouped upper electrodes 82 and 84. For example, an upper electrode group 32 may be configured to form a second lens unit Un of the liquid crystal layer 77. To this end, upper electrode groups at either side of the upper electrode group 32 may be configured to form second lens units Un−1 and Un+1, respectively. It is contemplated that the upper electrode groups are configured to form the same electrode pattern; however, it is also contemplated that different electrode patterns may be utilized.

According to exemplary embodiments, the electrode pattern associated with the first lower electrode group 31 and the electrode pattern associated with the second lower electrode group 32 are the same, but disposed in different positions in association with the second horizontal direction (e.g., y-axis direction). For example, a left edge of the lower electrode group 31 may be disposed in a first position p1 in the second horizontal direction (e.g., y-axis direction), and a left edge of the upper electrode group 32 corresponding to the lower electrode group 31 may be disposed in a second position p2. In this manner, the second position p2 may be on a side (e.g., left side) of the first position p1, and may be spaced apart from the first position p1 by, for instance, a predetermined distance "s." The second position p2 may be disposed on, for example, a side (e.g., right side) of the first position p1 and, thereby, spaced apart from the second position by, for example, the predetermined distance "s."

Although the relative position between one lower electrode group 31 and one upper electrode group 32 disposed closest to the lower electrode group 31 has been considered, it is noted that the same lower electrode group 31 may be repeatedly disposed on the lower electrode layers 72 and 74 in the second horizontal direction (e.g., y-axis direction), and the same upper electrode group 32 may be repeatedly disposed on the upper electrode layers 82 and 84 in the second horizontal direction (e.g., y-axis direction). Again, while different patterns and positions are contemplated, for descriptive purposes, similar patterns and positions will be described. In this manner, respective positions of the lower electrode layers 72 and 74 and/or respective positions of first lens units Ln−1, Ln, and Ln+1 disposed in association with the liquid crystal layer 77 will be described, hereinafter, on the basis of the first position p1. Similarly, positions of the upper electrode layers 82 and 84 and/or positions of second lens units Un−1, Un, and Un+1 disposed in association with the liquid crystal layer 77 will be described, hereinafter, on the basis of the second position p2. As mentioned above, an electrode pattern of the lower electrode layers 72 and 74 may be similar to an electrode pattern of the upper electrode layers 82 and 84, but the electrode pattern of the lower electrode layers 72 and 74 may be shifted from the electrode pattern of the upper electrode layers 82 and 84 by a predetermined distance "s" in the second horizontal direction (e.g., y-axis direction).

If a lens forming voltage is applied to the lower electrode layers 72 and 74, and a common voltage is applied to the upper electrode layers 82 and 84, a plurality of consecutively connected (or disposed) first lens units Ln−1, Ln, and Ln+1 may be formed in association with the liquid crystal lens 30 in the second horizontal direction (e.g., y-axis direction). Each of the first lens units Ln−1, Ln, and Ln+1 may be formed in the same shape.

If a common voltage is applied to the lower electrode layers 72 and 74, and a predetermined lens forming voltage is applied to the upper electrode layers 82 and 84, a plurality of consecutively connected second lens units Un−1, Un, and Un+1 may be formed in association with the liquid crystal lens 30 in the second horizontal direction (e.g., y-axis direction). Each of the second lens units Un−1, Un, and Un+1 may be formed in the same shape.

According to exemplary embodiments, the first lens units Ln−1, Ln, and Ln+1 may be spaced apart from the second lens units Un−1, Un, and Un+1 by a predetermined distance "s" in the second horizontal direction (e.g., y-axis direction). For example, one edge of the first lens unit Ln may be situated in the first position p1, whereas one edge of the second lens unit Un corresponding to the first lens unit Ln may be situated in the second position p2. As previously noted, the second position p2 is spaced apart from the first position p1 by the predetermined distance "s" in the second horizontal direction (e.g., y-axis direction). Accordingly, consecutively formed first lens units Ln−1, Ln, and Ln+1 may be shifted from the second lens units Un−1, Un, and Un+1 corresponding to the first lens units Ln−1, Ln, and Ln+1 by the predetermined distance "s" in the second horizontal direction (e.g., y-axis direction).

In exemplary embodiments, the first lens units Ln−1, Ln, and Ln+1 may be equal to one another in width or pitch P. The second lens units Un−1, Un, and Un+1 may also be equal to one another in width or pitch P, such that the width or pitch P of the second lens units Un−1, Un, and Un+1 are equal to the width or pitch P of the first lens units Ln−1, Ln, and Ln+1.

Although only three first lens units Ln−1, Ln, and Ln+1 and only three second lens units Un−1, Un, and Un+1 have been described in association with FIG. 3, it is contemplated that any suitable (e.g., greater) number of first and/or second lens units may be formed depending on the dimensional constraints of the display panel 20.

FIGS. 4A and 4B are, respectively, a cross-sectional view and a plan view of a lower electrode layer configured to drive a liquid crystal lens, according to exemplary embodiments.

As seen in FIGS. 4A and 4B, first and second lower electrode layers 72 and 74 may be alternately disposed in the second horizontal direction (e.g., y-axis direction). The second lower electrodes 74 may be disposed on (e.g., over) the first lower electrodes 72, such as in the vertical direction (e.g., z-axis direction), as well as spaced apart from the first lower electrodes 72.

The first and second lower electrodes 72 and 74 may be arranged symmetrically about the center C of each electrode group 31 in the second horizontal direction (e.g., y-axis direction). Each of the right half portions from the center C of each electrode group 31 to the right edge E, and each of the left half portions from the center C of each electrode group 31 to the left edge E may be divided into a plurality of zones, such as first, second, and third zones $1^{st}$ Zone, $2^{nd}$ Zone, and $3^{rd}$ Zone.

The plurality of zones $1^{st}$ Zone, $2^{nd}$ Zone, and $3^{rd}$ Zone may gradually decrease in width with a distance from the center C. For example, in terms of the width, the second zone may be formed with a width less than the width of the first zone, and the third zone may be formed with a width less than the width of the second zone.

According to exemplary embodiments, a plurality of electrodes 72 and 74 may be disposed in each of the first, second, and third zones. To this end, each of the first, second, and third zones may be divided into a plurality of subzones. For example, the first zone may include first to fourth subzones sZ1, sZ2, sZ3, and sZ4, which may be disposed in the listed order starting from the center C. As such, a first or second lower electrode 72 or 74 may be formed in each of the subzones sZ1, sZ2, sZ3, and sZ4.

Although the first and second lower electrodes 72 and 74 may be disposed in the same first, second, and third zones, the first, second, and third zones may be equal in width. A width of each of the first and second lower electrodes 72 and 74 and/or a gap between two adjacent first and second lower electrodes 72 and 74 may be disposed to gradually decrease depending on the distance between the center C and each of the first, second, and third zones. For example, the first and second lower electrodes 72 and 74 disposed in the first zone may be equal to each other in width. Also, the first and second lower electrodes 72 and 74 disposed in the second zone may be equal to each other in width, and the first and second lower electrodes 72 and 74 disposed in the third zone may be equal to each other in width. It is noted, however, that the first and second lower electrodes 72 and 74 disposed in the second zone may be formed with a width smaller than the first and second lower electrodes 72 and 74 disposed in the first zone, and the first and second lower electrodes 72 and 74 disposed in the third zone may be formed with a width smaller than the first and second lower electrodes 72 and 73 disposed in the second zone.

FIGS. 5A and 5B are, respectively, a cross-sectional view and a plan view of a lower electrode layer configured to drive a liquid crystal lens, according to exemplary embodiments.

As seen in FIGS. 5A and 5B, the first and second lower electrodes 72 and 74 may be formed so that a width of each of the first and second lower electrodes 72 and 74 and/or a gap between two adjacent first and second lower electrodes 72 and 74 may gradually decrease with a distance from the center C. In other words, the first and second lower electrodes 72 and 74 may be formed so that in each of the first, second, and third zones, a width of the first and second lower electrodes 72 and 74 and/or a gap between two adjacent first and second lower electrodes 72 and 74 gradually decrease with a distance from the center C. For example, a second lower electrode 74 disposed in the first subzone sZ1 may be formed with a width greater than a width of a first lower electrode 72 disposed in the second subzone sZ2. A first lower electrode 72 disposed in the second subzone sZ2 may be formed with a width greater than a width of a second lower electrode 74 disposed in the third subzone sZ3, and a second lower electrode 74 disposed in the third subzone sZ3 may be formed with a width greater than a width of a first lower electrode 72 disposed in the fourth zone sZ4.

Although each of the left and right halves of each electrode group 31 are shown to be divided into three corresponding zones, any suitable number of zones is contemplated and may be utilized to vary the display characteristics of display apparatus 10. Furthermore, although one first or second lower electrode 72 or 74 is formed in each of the subzones sZ1, sZ2, sZ3, and sZ4, a plurality of electrodes may be formed in each of the subzones sZ1, sZ2, sZ3, and sZ4.

According to exemplary embodiments, upper electrode layers 82 and 84 disposed on the second (or upper) substrate 80 of the liquid crystal lens 30 may be configured with the same shape as that of the lower electrodes 72 and 74, however, may be shifted from the first lower electrodes 72 and 74 by a predetermined distance "s" in the second horizontal direction (e.g., y-axis direction). As such, the upper electrode layers 82 and 84 may be the same as the lower electrode layers 72 and 74 in terms of the shape of an electrode pattern and the stacked structure. Therefore, to prevent exemplary embodiments from being obscured by unnecessary duplicative description, a description of the upper electrode layers 82 and 84 has been omitted.

FIGS. 6A to 6C demonstrate application of voltage to enable a liquid crystal lens to provide a Fresnel zone plate in association with a 3D display mode, in which phase retardation is enabled via application of a lens forming voltage to a lower electrode layer of the liquid crystal lens and application of a common voltage to an upper electrode layer of the liquid crystal lens, according to exemplary embodiments. To this end, FIG. 6A demonstrates alignment of liquid crystal molecules in the liquid crystal layer 77 when a lens forming voltage is applied to lower electrode layers 72 and 74 in liquid crystal lens 30, according to exemplary embodiments. FIG. 6B shows a lens forming voltage applied to the lower electrode layers 72 and 74, whereas FIG. 6C shows phase retardation in the liquid crystal layer 77 as a result of the application of the lens forming voltage being applied to lower electrode layers 72 and 74, according to exemplary embodiments.

With reference to FIGS. 6A to 6C, in a 3D display mode, the liquid crystal lens 30 may be configured as a Fresnel zone plate, which is illustrated in FIG. 6A. For example, the driver 40 may be configured to apply a lens forming voltage that increases/decreases in a step formation to the lower electrode layers 72 and 74 disposed in the first position p1, and apply a common voltage to the upper electrode layers 82 and 84 disposed in the second position p2. As such, in each of the first, second, and third zones of a lens group 31 included in the lower electrode layers 72 and 74, a voltage applied thereto may increase gradually as the corresponding subzones sZ1, sZ2, sZ3, and sZ4 extend from the center C of the lens group 31 towards the edge E thereof. For example, as seen in FIG. 6B, in the first zone, 2V may be applied to a second lower electrode 74-1 disposed closest to the center C of the lens unit, 2.5V may be applied to a first lower electrode 72-1 disposed closest to the center C, 3.5V may be applied to a second lower electrode 74-2 disposed second closest to the center C, and 6.5V may be applied to a first lower electrode 72-2 disposed second closest to the center C. A common voltage of, for instance, 0V may be applied to the first and second upper electrodes 82 and 84 disposed on the upper electrode layers 82 and 84.

According to exemplary embodiments, the higher the lens forming voltage applied to the lower electrode layers 72 and 74, the greater the strength of a vertical electric field formed in association with the liquid crystal layer 77. The higher the lens forming voltage or the greater the strength of an electric field, the more "vertically" oriented the liquid crystal molecules will be in the liquid crystal layer 77. On the other hand, the higher the lens forming voltage or the greater the strength of an electric field, the less the phase retardation will be for light propagating through the liquid crystal layer 77. FIG. 6C provides the distribution 90 of phase retardation in the liquid crystal layer 77 depending on the position in the horizontal direction of the liquid crystal lens 30. To this end, it is noted that the distribution 90 will be similar to a phase 91 of the Fresnel zone plate.

An example of realizing a phase modulation-type Fresnel zone plate including different 4-level phase retardation is described in more detail in conjunction with FIG. 6C. It is noted, however, that by varying the number of electrodes disposed in each of the first, second, and third zones, it is possible to provide an N-level (N≥4) phase modulation-type Fresnel zone plate. It is also noted that such a N-level (or multi-level) phase modulation-type Fresnel zone plate may be characterized by higher diffraction efficiency and higher light (or radiation) strength at the focal length, compared to other types of Fresnel zone plates (e.g., a kinoform zone plate, a sinusoidal phase modulation zone plate, and a binary phase modulation zone plate).

Although the multi-level phase modulation-type Fresnel zone plate is considered in FIGS. 6A to 6C, any other type of zone plates capable of providing a lenticular lens via adjustment of electrodes formed in the liquid crystal lens 30 and the type of voltage applied to the electrodes are contemplated, so long as such zone plates are capable of providing N-speed driving (where N is an integer) via disposition of electrodes in the same pattern on the upper and lower substrates of the liquid crystal lens 30, and sequentially and alternately applying a lens forming voltage thereto.

When the liquid crystal lens 30 is formed in a Fresnel zone plate type, a cell gap "d" of the liquid crystal layer 77 may be significantly reduced. For example, a GRadient INdex (GRIN) lens or a lenticular lens may require a cell gap of several tens of μm or more. A Fresnel zone plate-type liquid crystal lens 30, however, may be formed to have a cell gap "d" of several μm. For example, a 4-level type Fresnel zone plate may be formed to have a cell gap "d" of (or about) 2 to 3 μm. The Fresnel zone plate-type liquid crystal lens 30 may also be easily mass produced because it may be formed to have a small cell gap "d." The small gap between the lower and upper substrates 70 and 80 may further contribute to a reduction in distortion of an electric field due to a fringe field forming between the lower electrodes 72 and 74 and the upper electrodes 82 and 84. As such, a Fresnel zone plate-type liquid crystal lens 30 may enable free control of the liquid crystal molecules associated with liquid crystal lens 30, which enable improvements in the quality (e.g., resolution) of 3D images.

FIGS. 7A to 7C demonstrate application of voltage to enable a liquid crystal lens to provide a Fresnel zone plate in association with a 3D display mode, in which phase retardation is enabled via application of a lens forming voltage to an upper electrode layer of the liquid crystal lens and application of a common voltage to a lower electrode layer of the liquid crystal lens, according to exemplary embodiments. To this end, FIG. 7A demonstrates alignment of liquid crystal molecules in the liquid crystal layer 77 when a lens forming voltage is applied to upper electrode layers 82 and 84 in liquid crystal lens 30, according to exemplary embodiments. FIG. 7B shows a lens forming voltage applied to the upper electrode layers 82 and 84, whereas FIG. 7C shows phase retardation in the liquid crystal layer 77 as a result of the application of the lens forming voltage being applied to upper electrode layers 82 and 84, according to exemplary embodiments.

With reference to FIGS. 7A to 7C, in a 3D display mode, the liquid crystal lens 30 may be configured as a Fresnel zone plate, which is illustrated in FIG. 7A. For example, the driver 40 may be configured to apply a lens forming voltage that increases/decreases in a step formation to the upper electrode layers 82 and 84 disposed in the second position p2, and apply a common voltage to the lower electrode layers 72 and 74 disposed in the first position p1. It is noted that lens units formed in association with the liquid crystal lens 30 as shown in FIGS. 7A to 7C may be disposed in the first position p1, and may be shifted from the lens units, which are formed in the second position p2 in the liquid crystal lens 30 shown in FIGS. 6A to 6C, by a predetermined distance "s" in the horizontal direction.

According to exemplary embodiments, in each of the first, second, and third zones of the upper layer electrode layers 82 and 84, a voltage applied thereto may be configured to increase gradually as the corresponding subzones sZ1, sZ2, sZ3, and sZ4 extend from the center C of the lens group 32 toward the edge E thereof. For example, as seen in FIG. 7B, in the first zone, 2V may be applied to a second upper electrode 84-1 disposed closest to the center C of the lens group 32, 2.5V may be applied to a first upper electrode 82-1 disposed closest to the center C, 3.5V may be applied to a second upper electrode 84-2 disposed second closest to the center C, and 6.5V may be applied to the first upper electrode 82-2 disposed second closest to the center C. A common voltage of, for example, 0V may be applied to the first and second lower electrodes 72 and 74 disposed on the lower electrode layers 72 and 74.

As seen in FIG. 7C, the distribution 92 of phase retardation in the liquid crystal layer 77 depending on the position in the horizontal direction of the liquid crystal lens 30 is provided. It is noted that the distribution 92 will be similar to a phase 93 of the Fresnel zone plate.

Figure 8A:
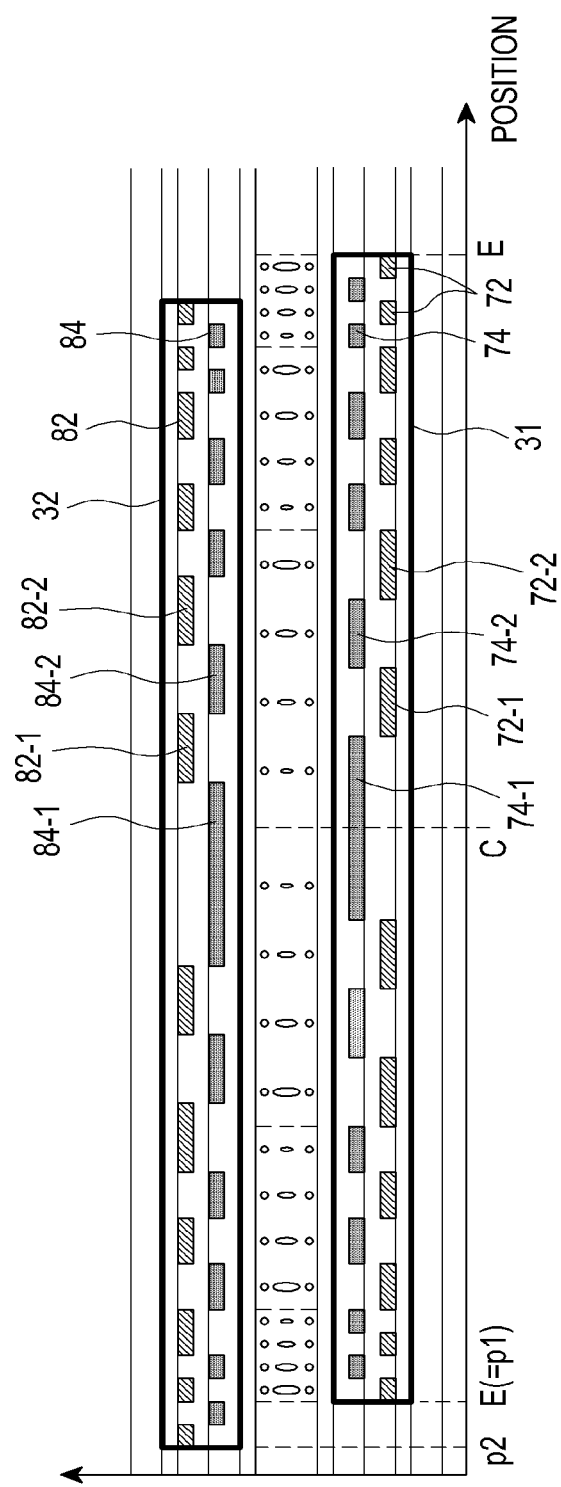

FIGS. 8A to 8C demonstrate application of voltage to enable a liquid crystal lens to provide a Fresnel zone plate in association with a 3D display mode, in which phase retardation is enabled via application of a lens forming voltage to a lower electrode layer of the liquid crystal lens and application of a common voltage to an upper electrode layer of the liquid crystal lens, according to exemplary embodiments.

It is noted that the disposition of the various components of the liquid crystal lens 30, as seen in FIG. 8A, may be similar to that as described in association with FIG. 6A and, therefore, a duplicative description is not provided to prevent obscuring exemplary embodiments.

With reference to FIG. 8B, in a 3D display mode, a driving voltage configured to form a lens may be applied to the lower electrode layers 72 and 74 disposed in the first position p1, and a common voltage may be applied to the upper electrode layers 82 and 84 disposed in the second position p2. For example, a voltage applied to the lower electrodes 72 and 74 shown in FIG. 8B is different from the driving voltage depicted in association with FIG. 6B in that a positive (+) voltage is applied to odd-numbered zones (e.g., first and third zones) and a negative (−) voltage is applied to an even-numbered zones (e.g., second zone). The other characteristics of the driving voltage, however, are similar to those described in association with FIGS. 6A to 6C and, as such, a duplicative description is not provided to prevent obscuring exemplary embodiments.

With configured reference to FIG. 8B, positive voltages (e.g., +2V, +2.5V, +3.5V, and +6V) that gradually increase as subzones sZ1, sZ2, sZ3, and sZ4 extend from the center C of the lens group 31 to the edge E thereof, may be applied to four electrodes included in the first zone of the lower electrode layers 72 and 74, respectively. Negative voltages (e.g., −2V, −2.5V, −3.5V, and −6V) that gradually decrease as subzones sZ1, sZ2, sZ3, and sZ4 extend from the center C of the lens group 31 to the edge E thereof, may be applied to four electrodes included in the second zone, respectively. Positive voltages (e.g., +2V, +2.5V, +3.5V, and +6V) that gradually increase as subzones sZ1, sZ2, sZ3, and sZ4 extend from the center C of the lens unit group 31 to the edge E thereof, may be applied to four electrodes included in the third zone, respectively. While the voltages +2V, +2.5V, +3.5V and +6V applied to the odd-numbered zones, e.g., the first and third zones, and the voltages −2V, −2.5V, −3.5V and −6V applied to the even-numbered zones, e.g., the second zone, may be different in polarity, the voltages may be equal in absolute value.

According to exemplary embodiments, when lens forming voltages with different polarities are applied to two adjacent zones (e.g., the first and second zones, the second and third zones, etc.) in each of the left and right halves of each lens group, polarization of the liquid crystal molecules associated with the liquid crystal layer 77 may be changed at a boundary between the two adjacent zones. As such, rotation efficiency of the liquid crystal molecules may be improved and, as such, the phase distribution 90, which is closer to the phase 91 of the Fresnel zone plate shown in FIG. 8C, may be enabled. When voltages with different polarities are applied between the two adjacent zones (e.g., the first and second zones, the second and third zones, etc.), crosstalk may be improved by 10% or more, compared to when lens forming voltages with the same polarity are applied to each of the first, second, and third zones as described in association with FIGS. 6A to 7C. In exemplary embodiments, such as described in association with FIGS. 8A to 8C, the lowest voltage among the lens forming voltages may be set as a voltage of +2V or −2V, which is greater than 0V. As such, the liquid crystal molecules associated with liquid crystal lens 30 may be enabled to more easily rotate by establishing higher voltage differences (e.g., +/−8V) between adjacent zones, which also contributes to the improvement of rotation efficiency.

Figure 9A:
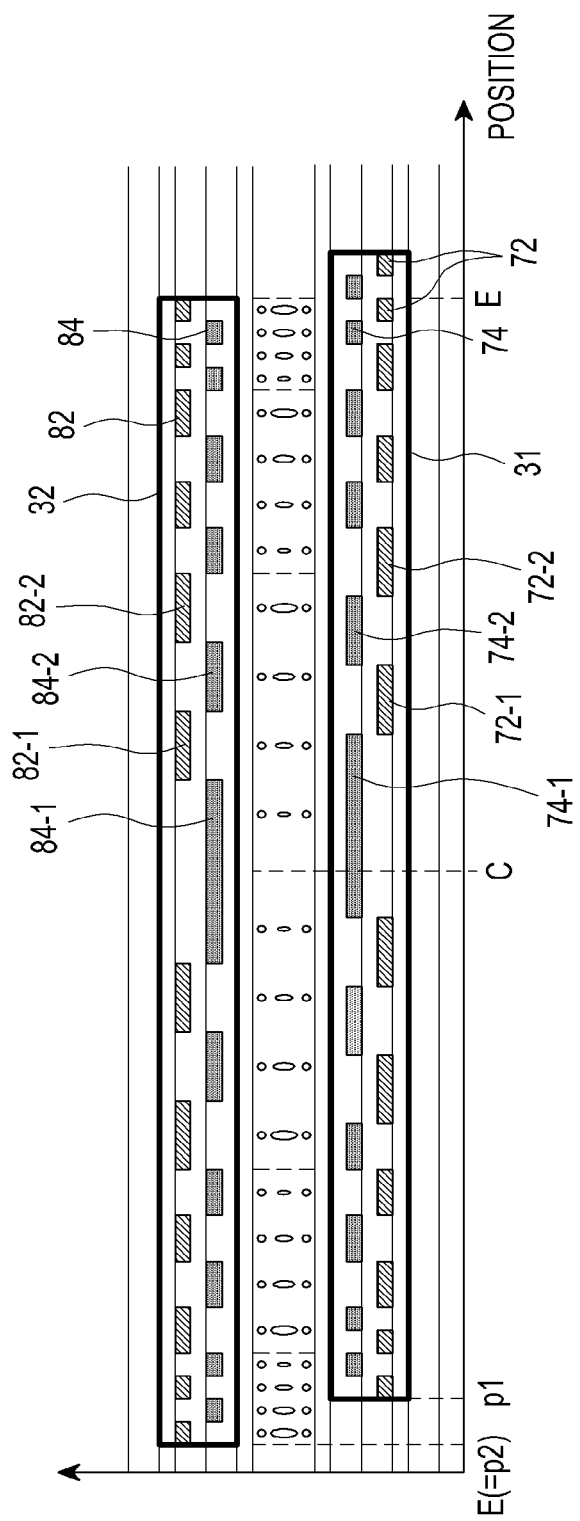

FIGS. 9A to 9C demonstrate application of voltage to enable a liquid crystal lens to provide a Fresnel zone plate in association with a 3D display mode, in which phase retardation is enabled via application of a lens forming voltage to a plurality of upper electrode layers of the liquid crystal lens and application of a common voltage to a plurality of lower electrode layers of the liquid crystal lens, according to exemplary embodiments. For instance, a lens forming voltage may be applied to upper electrode layers 82 and 84 of the liquid crystal lens 30 and a common voltage may be applied to lower electrode layers 72 and 74.

With reference to FIGS. 9A to 9C, in a 3D display mode, a lens forming voltage may be applied to the upper electrode layers 82 and 84 disposed in the second position p2, and a common voltage may be applied to the lower electrode layers 72 and 74 disposed in the first position p1. It is noted that a voltage applied to the upper electrode layers 82 and 84 (as shown in FIG. 9B) is different from that of FIG. 7B in that a positive (+) voltage is applied to odd-numbered zones (e.g., the first and third zones) and a negative (−) voltage is applied to even-numbered zones (e.g., the second zone). The other characteristics of the driving voltage;

however, are similar to those described in association with FIGS. 7A to 7C and, as such, a duplicative description is not provided to prevent obscuring exemplary embodiments.

With continued reference to FIG. 9B, positive voltages (e.g., +2V, +2.5V, +3.5V and +6V) that gradually increase as subzones sZ1, sZ2, sZ3, and sZ4 extend from the center C of the lens group 32 to the edge E thereof, may be applied to four electrodes included in the first zone of the upper electrode layers 82 and 84, respectively. Negative voltages (e.g., −2V, −2.5V, −3.5V and −6V) that gradually decrease as subzones sZ1, sZ2, sZ3, and sZ4 extend from the center C of the lens group 32 to the edge E thereof, may be applied to four electrodes included in the second zone, respectively. Positive voltages (e.g., +2V, +2.5V, +3.5V and +6V) that gradually increase as subzones sZ1, sZ2, sZ3, and sZ4 extend from the center C of the lens group 32 to the edge E thereof, may be applied to four electrodes included in the third zone, respectively. While the voltages +2V, +2.5V, +3.5V and +6V applied to the odd-numbered zones, e.g., the first and third zones, and the voltages −2V, −2.5V, −3.5V and −6V applied to the even-numbered zones, e.g., the second zone, are different in polarity, the voltages may be equal in absolute value.

Figure 10:
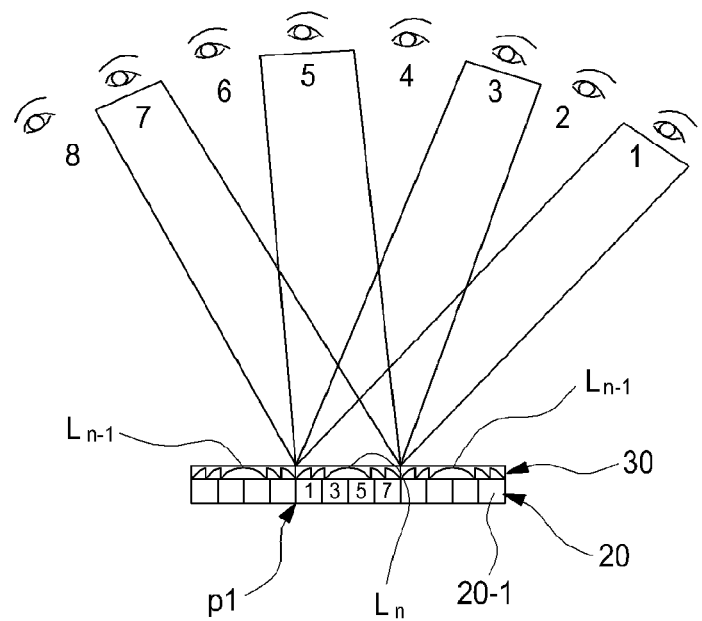
FIGS. 10 and 11 illustrate multiple vantage points based on the configuration of a zone plate formed via a liquid crystal lens operating in association with a 3D display mode, according to exemplary embodiments.
Figure 11:
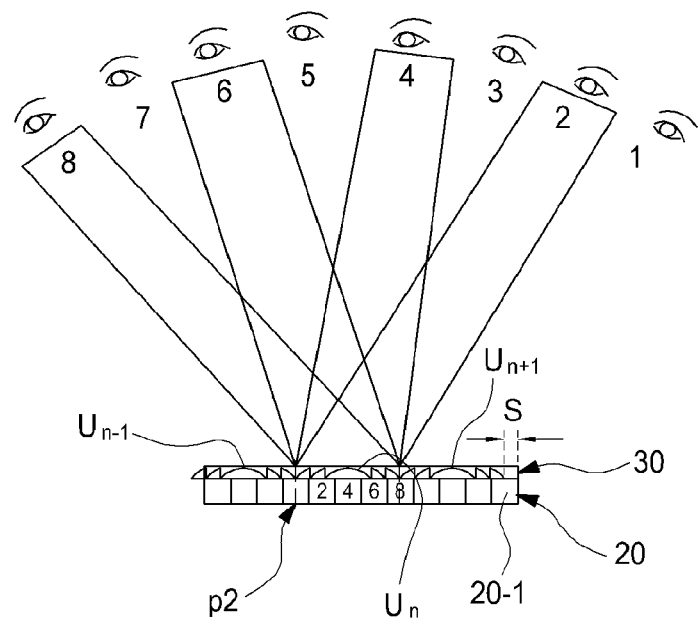

According to exemplary embodiments, when voltages with different polarities are applied to two adjacent zones (e.g., the first and second zones, the second and third zones, etc.) in each of the left and right halves of each lens group, polarization of the liquid crystal molecules associated with the liquid crystal layer 77 may be changed at a boundary between the two adjacent zones. As such, rotation efficiency of the liquid crystal molecules may be improved and, as such, the phase distribution 92, which is closer to the phase 93 of the Fresnel zone plate shown in FIG. 9C, may be enabled. When voltages with different polarities are applied between the two adjacent zones (e.g., the first and second zones, the second and third zones, etc.), crosstalk may be improved by 10% or more, compared to when lens forming voltages with the same polarity are applied to each of the first, second, and third zones as described in association with FIGS. 6A to 7C. In exemplary embodiments, such as described in association with FIGS. 9A to 9C, the lowest voltage among the lens forming voltages may be set as a voltage of +2V or −2V, which is greater than 0V. As such, the liquid crystal molecules associated with liquid crystal lens 30 may be enabled to more easily rotate by establishing higher voltage differences (e.g., +/−8V) between adjacent zones, which also contributes to the improvement of rotation efficiency FIGS. 10 and 11 illustrate multiple vantage points based on the configuration of a zone plate formed via a liquid crystal lens operating in association with a 3D display mode, according to exemplary embodiments. In FIGS. 10 and 11, the 2D/3D switchable display apparatus 10 is assumed to display eight (8) views in the 3D display mode; however, it is contemplated that any number of suitable zones may be configured in association with exemplary embodiments.

Adverting to FIG. 10, in a 3D display mode, a plurality of consecutively disposed lens units Ln−1, Ln, and Ln+1 may be formed in the first position p1 of the liquid crystal lens 30 via application of a lens forming voltage (or profile) to the lower electrode layers 72 and 74 of the liquid crystal lens 30, and application of a common voltage to the upper electrode layers 82 and 84 thereof.

While the lens units Ln−1, Ln, and Ln+1 may be disposed in the first position p1, odd-numbered frames may be displayed via the display panel 20 in association with these lens units. As seen in in FIG. 10, image data for views 1, 3, 5, and 7 may be sequentially provided to subpixels 20-1 of the display panel 20. As such, the odd-numbered frames may be configured to display 3D images for odd views 1, 3, 5, and 7, according to exemplary embodiments.

Adverting to FIG. 11, in a 3D display mode, lens units Un−1, Un, and Un+1 may be formed in the second position p2, which may be spaced apart from a side (e.g., left side) of the first position p1 by a predetermined distance "s," via application of a lens forming voltage (or profile) to the upper electrode layers 82 and 84 of the liquid crystal lens 30, and via application of a common voltage to the lower electrode layers 72 and 74, thereof.

While the lens units Un−1, Un, and Un+1 may be disposed in the second position p2, even-numbered frames may be displayed via the display panel 20 in association with these lens units. As seen in FIG. 11, image data for views 2, 4, 6, and 8 may be sequentially provided to subpixels 20-1 of the display panel 20. As such, the even-numbered frames may be configured to display 3D images for even views 2, 4, 6, and 8, according to exemplary embodiments.

In exemplary embodiments, 3D images for odd views and 3D images for even views may be alternately displayed via the display panel 20, and the liquid crystal lens 30 may be configured to directionally provide the 3D images for odd views and the 3D images for even views to their corresponding directions, e.g., left-eye direction or right-eye direction. Odd-view images and even-view images may be provided to the left and right eyes of, for instance, viewer 2 (depicted in FIG. 2), respectively, so the viewer 2 may benefit from the binocular perception of depth without necessarily wearing any polarizing glasses or any "other" headgear.

For example, eight views may be provided by sequentially driving lens units Ln−1, Ln, Ln+1, Un−1, Un, and Un+1 (each with a width or pitch P corresponding to four subpixels consecutively disposed in the horizontal direction of the display panel 20) in a 2× time division manner. For the same reason, if the width P of each of the lens units Ln−1, Ln, Ln+1, Un−1, Un, and Un+1 is k times the width of one subpixel (where k is an integer of 2 or more), 2k views may be provided.

As seen in FIGS. 10 and 11, the shifted distance between the lens units Ln−1, Ln, and Ln+1 and the lens units Un−1, Un, and Un+1, i.e., a distance "s" between the first position p1 and the second position p2, may be set as a distance associated with forming two adjacent views. For example, if the two adjacent views are assumed to be a view #1 (e.g., a left-eye view) and a view #2 (e.g., a right-eye view), the lens unit Ln may be configured to provide left-eye images in association with the view #1 and the lens unit Un may be configured to provide right-eye images in association with the view #2, so the viewer 2 may benefit from the binocular perception of depth without necessarily wearing any polarizing glasses or any "other" headgear. Accordingly to exemplary embodiments, the shifted distance "s" may be configured as short as possible, so that a large number of different views may be provided in association with display apparatus 10. The shifted distance "s" may be configured as (½+n)×a view period on a panel surface, where n denotes an integer.

Figure 12:
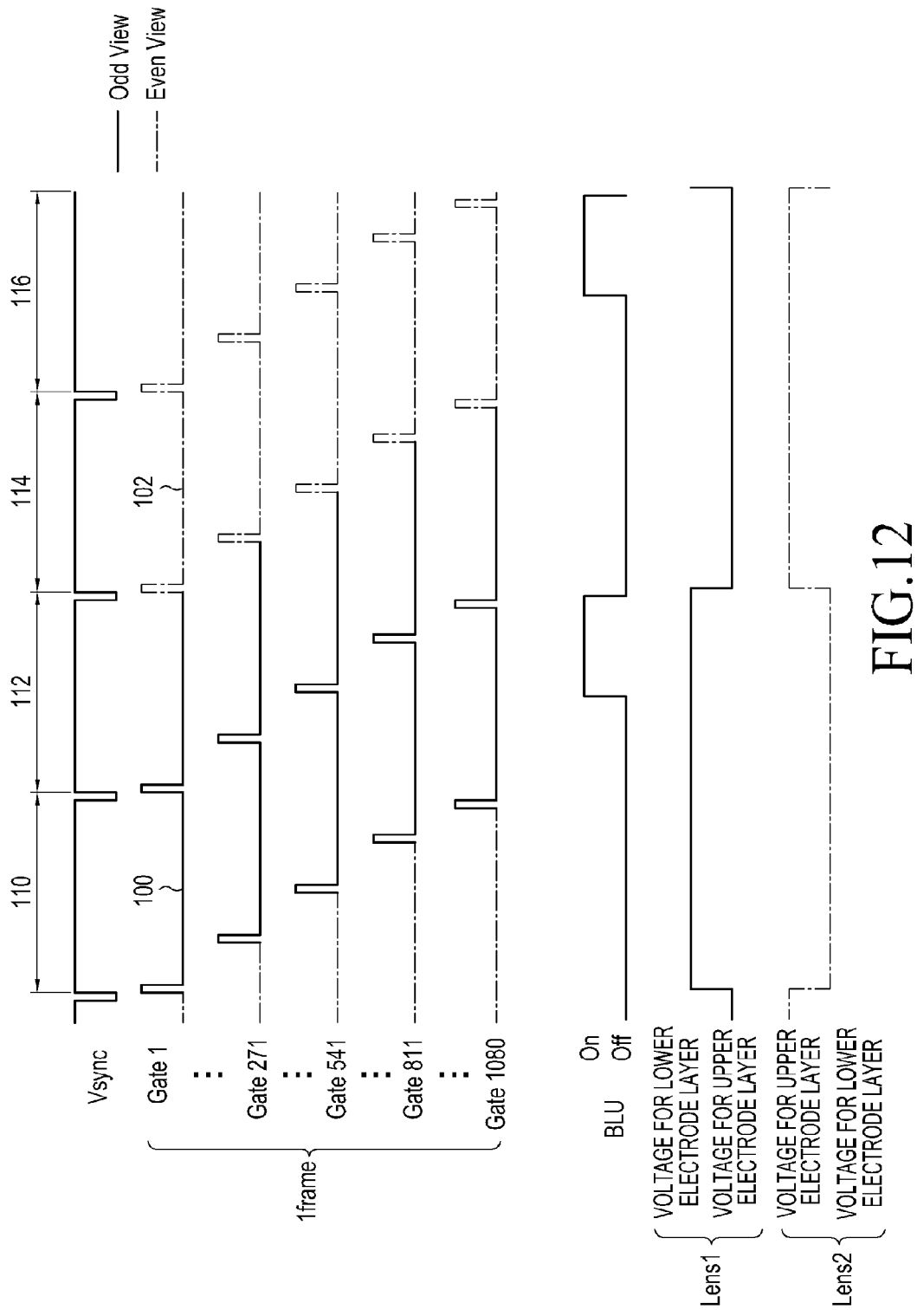
FIG. 12 is a timing diagram associated with driving a 2D/3D switchable display apparatus, according to exemplary embodiments.

FIG. 12 is a timing diagram associated with driving a 2D/3D switchable display apparatus, according to exemplary embodiments.

With reference to FIG. 12, there is shown a Full High Definition (FHD) driving scheme (e.g., 240 Hz driving scheme with a 2D resolution of 1920×1080), where gate driving voltages are sequentially applied to gate lines Gate 1 to Gate 1080 in sync with a vertical synchronization signal Vsync for one frame of 4.2 ms. Although gate driving voltages are shown by a solid line 100, odd-view images are displayed via the liquid crystal panel 22. Further, although gate driving voltages shown by an alternated long and short dash line 102 are applied, even-view images are displayed via the liquid crystal panel 22.

According to exemplary embodiments, the liquid crystal panel 22 may be configured to display each of the odd-view images and even-view images twice. To this end, the odd-view images and even-view images may be represented as first and second frames of odd-view images and first and second frames of even-view images, which are consecutively provided to the liquid crystal panel 22.

While odd-view images are displayed via the liquid crystal panel 22, a lens driving voltage may be applied to the lower electrode layers 72 and 74 of the liquid crystal lens 30, and a common voltage may be applied to the upper electrode layers 82 and 84 thereof. To this end, while even-view images are displayed via the liquid crystal panel 22, a lens forming voltage may be applied to the upper electrode layers 82 and 84 of the liquid crystal lens 30, and a common voltage may be applied to the lower electrode layers 72 and 74 thereof.

According to exemplary embodiments, the back light unit 24 may be turned on for at least some time in association with a second frame whenever the same odd-view image and even-view image is displayed for a second time. Namely, reasons for turning the back light unit 24 off while the first frame of the odd-view image or even-view image is displayed via the liquid crystal panel 22 and turning the back light unit 24 on while the second frame of the odd-view image or even-view image is displayed via the liquid crystal panel 22, are described in more detail below.

For example, when the liquid crystal panel 22 is driven at 240 Hz, a frame period of 4.17 ms may be utilized to display a 1-frame image. If the number of gate lines Gate 1 to Gate 1080 is 1080, a difference between the time that a gate driving voltage is applied to one gate line and the time that a gate driving voltage is applied to the next gate line is 0.0039 ms (=4.17 ms/1080). As such, the time before the start of the display of the next frame after one frame is fully displayed as gate driving voltages are applied to all of the gate lines Gate 1 to Gate 1080 (e.g., the time before a gate driving voltage is applied again to the first gate line Gate 1 after a gate driving voltage is applied to the last gate line Gate 1080) is only 0.0039 ms.

To this end, the liquid crystal lens 30 may be formed thick enough to form lens units with a constant focal length. For example, although the liquid crystal layer 54 of the liquid crystal panel 22 may be formed with a thickness of 0.004 mm, the liquid crystal layer 77 of the liquid crystal lens 30 may be 1.114 mm thick. Accordingly, although the liquid crystal layer 54 of the liquid crystal panel 22 may have a response time of 2.08 ms, the liquid crystal layer 77 of the liquid crystal lens 30 may have a response time of 6.25 ms. As such, an exemplary response time (6.25 ms) of the liquid crystal layer 77 for the liquid crystal lens 30 to serve as a normal lens, may be greater than the response time (4.17ms) of the liquid crystal layer 54 for the liquid crystal panel 22 to display a 1-frame image.

Moreover, for the liquid crystal lens 30 to serve as a lens and provide 3D images to a plurality of views in association with a 3D display mode, the liquid crystal lens 30 may be configured to form lens units in fixed positions after an image for each view is fully displayed via the liquid crystal panel 22. As such, if positions of the lens units in the liquid crystal lens 30 are changed or shifted in the middle of a process where an image for one view is being displayed via the liquid crystal panel 22, then the image of the frame may not be entirely formed.

According to exemplary embodiments, therefore, the liquid crystal panel 22 may be configured to display an image for each view twice and to turn on the back light unit 24 for at least some time associated with a second frame of the image for each view. For example, given that the response time (6.25 ms) of the liquid crystal lens 30 is generally greater than the response time (4.17 ms) of the liquid crystal panel 22, as for the time Δt in which the back light unit 24 is turned on, the back light unit 24 may be turned on for a predetermined time after the response time of the liquid crystal lens 30 in periods 112 and 116 of the second frame associated with the display of a second frame of an image for each view. In other words, when the time at which the periods 112 and 116 of the second frame start is assumed to be 0.00 ms, the time Δt may be approximately 2.08 ms to 4.17 ms. Accordingly, the viewer 2 may view an image of an odd-view frame or even-view frame for about 2 ms (=8.3-6.25 ms) in the period (about 8.3 ms) of the second frame of the same image. It is contemplated, however, that the time Δt in which the back light unit 24 is turned on may be changed depending on the response time of the liquid crystal lens 30 and the liquid crystal panel 22.

While exemplary embodiments of liquid crystal lens 30 have been described in connection the formation of a Fresnel zone plate, it is contemplated that any other suitable type of lens may be formed, such as a GRIN lens, lenticular lens, etc. To this end, liquid crystal lens 30 may be configured with lower and upper electrode layers formed in the same pattern and formation positions of the lens units may be shifted as a lens forming voltage is applied to the lower and upper electrode layers alternately, contributing to a 2-fold increase in the number of views.

According to exemplary embodiments, the 2D/3D switchable display apparatus 10 may drive the liquid crystal lens 30 in a 2× time division manner in association with a 3D display mode, which makes it possible to double the number of possible views at a same resolution as 2D modes. To this end, the 2D/3D switchable display apparatus 10 may double the number of possible views in association with a 3D display mode at the same resolution of a 2D display mode by driving the liquid crystal lens 30 in a 2× time division manner, and may halve the gap between the liquid crystal lens 30 and the display panel 20. For example, a conventional glass plate, which may include a thickness of 15 mm, and is typically used as a gap spacing plate, may be replaced with a glass plate with a thickness of (or about) 7.5 mm, which makes it possible to manufacture a slimmer 2D/3D switchable display apparatus 10. In addition, exemplary embodiments enable a liquid crystal lens 30 suitable for time division driving and a 2D/3D switchable display apparatus 10 incorporating the same.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A display device driving method, comprising:
   causing, at least in part, a liquid crystal layer to be switched from a two-dimensional display mode to a three-dimensional display mode;
   receiving image data associated with the three-dimensional display mode;
   causing, at least in part, a first plurality of electrodes disposed on the liquid crystal layer to be driven in association with a voltage profile based on the image data and a second plurality of electrodes disposed on the liquid crystal layer to be driven in association with a common voltage, the first plurality of driven electrodes being configured to cause the liquid crystal layer to form a plurality of lens units in association with a first position of the liquid crystal layer; and
   causing, at least in part, the second plurality of electrodes to be driven in association with the voltage profile based on the image data and the first plurality of electrodes to be driven in association with the common voltage, the second plurality of driven electrodes being configured to cause the liquid crystal layer to form the plurality of lens units in association with a second position of the liquid crystal layer,
   wherein the first position and the second position are laterally spaced apart by a distance "s" associated with a view period of a ($\frac{1}{2}$+n) surface, where n is an integer.

2. The display driving method according to claim 1, further comprising:
   causing, at least in part, a plurality of first-view images to be displayed in association with the plurality of lens units disposed in association with the first position; and
   causing, at least in part, a plurality of second-view images to be displayed in association with the plurality of lens units disposed in association with the second position.

3. The display driving method according to claim 2, further comprising:
   causing, at least in part, a back light unit to be turned off in association with a first presentation of each of the plurality of first-view images and the plurality of second-view images; and
   causing, at least in part, the back light unit to be turned on in association with at least a portion of a second presentation of each of the plurality of first-view images and the plurality of second-view images.

4. The display driving method according to claim 1, wherein the voltage profile comprises positive voltage portions and negative voltage portions.

5. The display driving method according to claim 4, wherein absolute values of the positive voltage portions are equal to corresponding absolute values of the negative voltage portions.

6. The display driving method according to claim 4, wherein:
   the first plurality of electrodes and the second plurality of electrodes are divided into corresponding pluralities of electrode groups; and
   the voltage profile is configured to drive first ones of the corresponding pluralities of the electrode groups according to the positive voltage portions and drive second ones of the corresponding pluralities of the electrode groups according to the negative voltage portions.

7. The display driving method according to claim 6, wherein the first ones of the corresponding pluralities of the electrode groups are disposed directly adjacent to respective ones of the second ones of the corresponding pluralities of the electrode groups.

8. The display driving method according to claim 1, wherein the plurality of lens units are configured to form a Fresnel lens.

9. The display driving method according to claim 1, wherein a liquid crystal lens comprises the liquid crystal layer and the liquid crystal lens is disposed on a display panel comprising another liquid crystal layer.

10. The display driving method according to claim 1, wherein the distance "s" is half of a length of a subpixel of the liquid crystal layer.

* * * * *